United States Patent
Zhao et al.

(10) Patent No.: US 12,008,439 B2
(45) Date of Patent: Jun. 11, 2024

(54) METHODS FOR SHARING MACHINE LEARNING BASED WEB SERVICE MODELS

(71) Applicant: JPMorgan Chase Bank, N.A., New York, NY (US)

(72) Inventors: Jun Zhao, Chappaqua, NY (US); Bhupinder S. Bahra, London (GB); Taqreez Ali, Bangalore (IN)

(73) Assignee: JPMORGAN CHASE BANK, N.A., New York, NY (US)

( * ) Notice: Subject to any disclaimer, the term of this patent is extended or adjusted under 35 U.S.C. 154(b) by 334 days.

(21) Appl. No.: 16/205,565

(22) Filed: Nov. 30, 2018

(65) Prior Publication Data
US 2020/0175416 A1   Jun. 4, 2020

(51) Int. Cl.
*G06N 20/00*   (2019.01)

(52) U.S. Cl.
CPC .................... *G06N 20/00* (2019.01)

(58) Field of Classification Search
CPC ...... G06N 20/00; G06N 3/0985; G06N 3/091; G06N 3/08
See application file for complete search history.

(56) References Cited

U.S. PATENT DOCUMENTS

| | | | | |
|---|---|---|---|---|
| 8,364,613 B1* | 1/2013 | Lin | ........................ | G06N 7/005 706/12 |
| 10,262,271 B1* | 4/2019 | Doddi | ..................... | G06N 20/00 |
| 10,936,947 B1* | 3/2021 | Flunkert | ................ | G06N 3/044 |
| 11,334,790 B1* | 5/2022 | Godfrey | ................. | G06Q 10/04 |
| 2008/0154821 A1* | 6/2008 | Poulin | ................ | G06Q 10/0631 706/21 |
| 2016/0162458 A1* | 6/2016 | Munro | .................... | G06F 16/93 715/230 |
| 2016/0300156 A1* | 10/2016 | Bowers | ...................... | G06F 9/46 |
| 2018/0060759 A1* | 3/2018 | Chu | ....................... | G06N 20/00 |
| 2018/0211164 A1* | 7/2018 | Bazrafkan | ............. | G06N 3/088 |
| 2019/0362841 A1* | 11/2019 | Aysin | ..................... | G16H 40/60 |
| 2020/0097847 A1* | 3/2020 | Convertino | ......... | G06F 11/3447 |
| 2020/0250515 A1* | 8/2020 | Rifkin | .................. | G06N 3/0472 |

OTHER PUBLICATIONS

Baylor, A TensorFlow-Based Production-Scale Machine Learning Platform (Year: 2017).*

* cited by examiner

*Primary Examiner* — Abdullah Al Kawsar
*Assistant Examiner* — Tewodros E Mengistu
(74) *Attorney, Agent, or Firm* — GREENBLUM & BERNSTEIN, P.L.C.

(57) ABSTRACT

An embodiment of the present invention relates to computer implemented methods and systems for receiving, by a model training device, a request for utilizing an adjustable management system by a user at a client device; wherein the client device is connected to the model training device over a network; sharing, by the model training device, an adjustable model management system comprising machine learning models and corresponding datasets in response to the received request to the client device; receiving an action from the client device, the action selected from a plurality of machine learning model services selected from the adjustable model management system; and executing an action by the model training device, to effect a change to a machine learning model saved into memory on the model training device, based on the received action.

12 Claims, 23 Drawing Sheets

METHODS FOR SHARING MACHINE LEARNING BASED WEB SERVICE MODELS

FIELD OF THE INVENTION

The present invention relates generally to machine learning based web service models and, more particularly, to methods and devices for creating and sharing machine learning based web service models.

BACKGROUND OF THE INVENTION

Organizations are increasingly implementing machine learning to take advantage of artificial intelligence to derive practical value for a variety of applications. Developing such practical machine learning applications from scratch, however, involves a number of time consuming and inefficient procedures, including setting up environments for creating a machine learning model, acquiring testing data, training and optimizing the machine learning model, publishing the optimized machine learning model, and sharing the machine learning model with others. For example, a programmer with significant knowhow with libraries such as TensorFlow and Keras, must devote a significant amount of time in order to set up an environment from scratch. Once set up, optimizing the machine learning model requires manual and time consuming processes which may cause inconsistent results. Further, publishing optimized machine learning models is usually a manual process. These manual processes often introduce unnecessary model risk because of potential training data inconsistency, library version difference, and other human errors etc. Furthermore, sharing of the machine learning model among team members is conventionally achieved by manually copying files and libraries, which is both time consuming and error prone.

Accordingly, there is a need to improve the conventional development process cycle of the machine learning model in order to increase efficiency when developing and implementing machine learning applications.

SUMMARY OF THE INVENTION

According to one embodiment, the invention relates to a computer implemented method comprising: receiving, by a model training device, a request for utilizing an adjustable management system by a user at a client device; wherein the client device is connected to the model training device over a network; sharing, by the model training device, an adjustable model management system comprising machine learning models and corresponding datasets in response to the received request to the client device; receiving an action from the client device, the action selected from a plurality of machine learning model services selected from the adjustable model management system; and executing an action by the model training device, to effect a change to a machine learning model saved into memory on the model training device, based on the received action.

The invention may be embodied by numerous other devices and methods. The description provided herein, when taken in conjunction with the annexed drawings, discloses examples of the invention. Other embodiments, which incorporate some or all steps as taught herein, are also possible.

DETAILED DESCRIPTION OF EMBODIMENTS OF THE INVENTION

Exemplary embodiments of the invention will now be described in order to illustrate various features of the invention. The embodiments described herein are not intended to be limiting as to the scope of the invention, but rather are intended to provide examples of the components, use, and operation of the invention. The embodiments described herein provide an exemplary model training device and method that enables remote users on a client device(s) to perform a variety of features relating to the machine learning development process. In particular the embodiments describe a centralized model training device and methods, which enables users at client device to efficiently access, upload, create, test, publish and share machine learning models, and data related thereto in an organized manner. Advantageously, the exemplary embodiments provide a more efficient, less error prone, and more convenient process of training, developing and sharing machine learning models as compared to conventional systems. By publishing trained model as web service, it will enable other application seamlessly integrate with the machine learning model therefore maximize its benefits as web service is the modern standard way of communication among applications.

Figure 1:
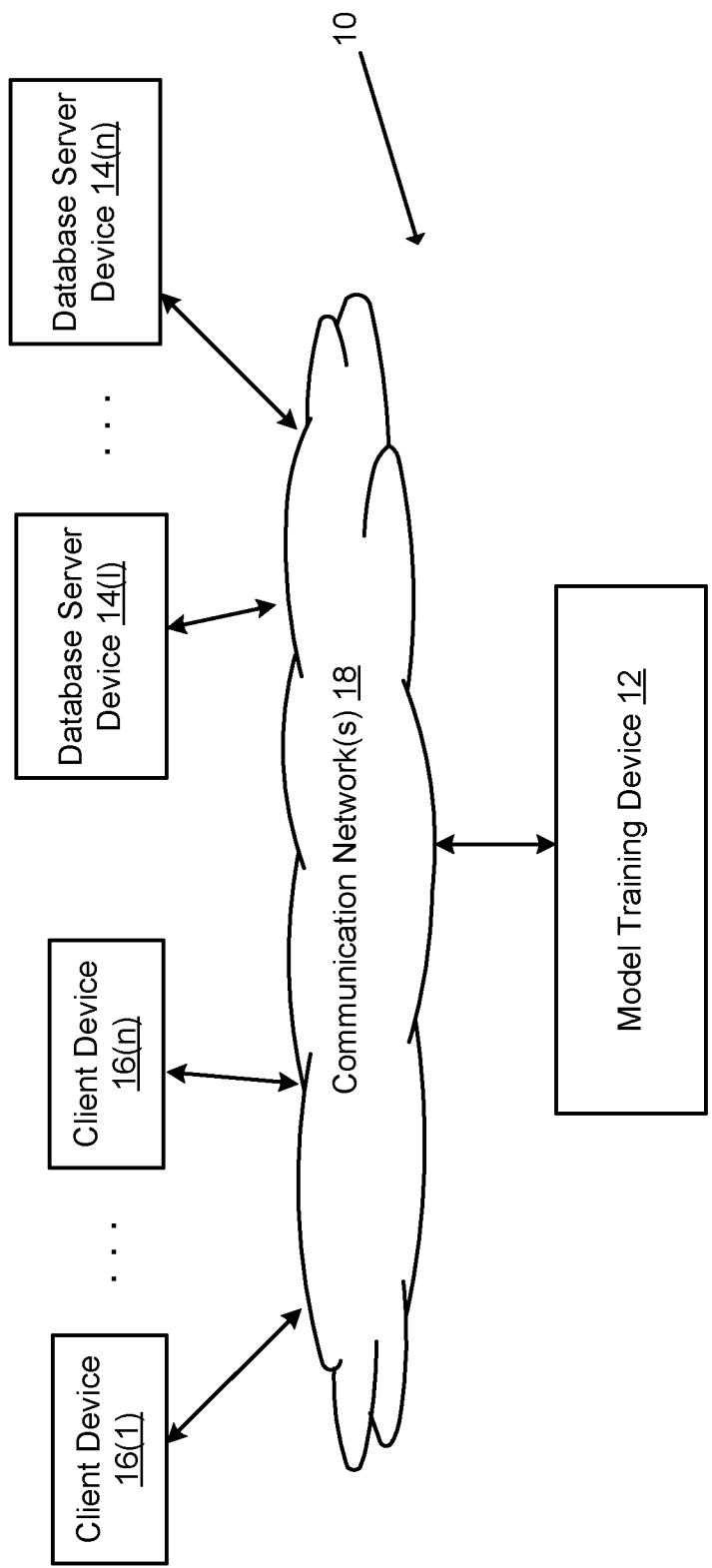
FIG. 1 is a block diagram of an exemplary network environment with an exemplary model training device.

Exemplary methods and devices for creating and sharing machine learning based web service models are described herein. Referring to FIG. 1, an exemplary network environment 10 including an exemplary model training device 12 is illustrated. The model training device 12 may be coupled, via communication network(s) 18 to client devices 16(1)-16(n), and database server devices 14(1)-14(n). Alternatively, the model training device 12, database server devices 14(1)-14(n), and/or client devices 16(1)-16(n), may be coupled together via other network topologies. For example, the communication network(s) may comprise any one or more of the Internet, an intranet, a Local Area Network (LAN), a Wide Area Network (WAN), an Ethernet connection, a Wi-Fi network, a Global System for Mobile Communication (GSM) link, a cellular phone network, a Global Positioning System (GPS) link, a satellite communications network, or other network.

Figure 2A:
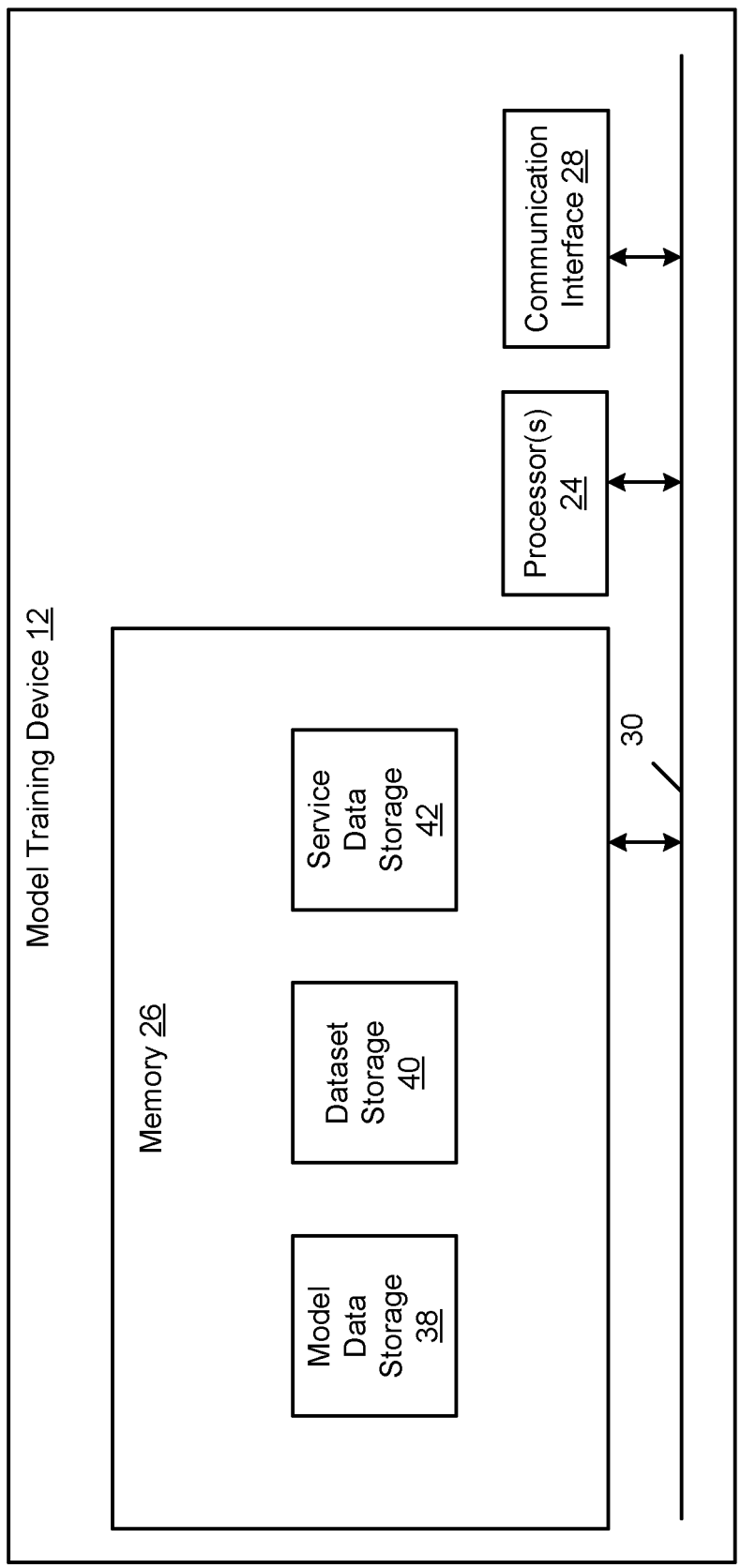
FIGS. 2A and 2B are block diagrams of the exemplary model training device of FIG. 1.
Figure 2B:
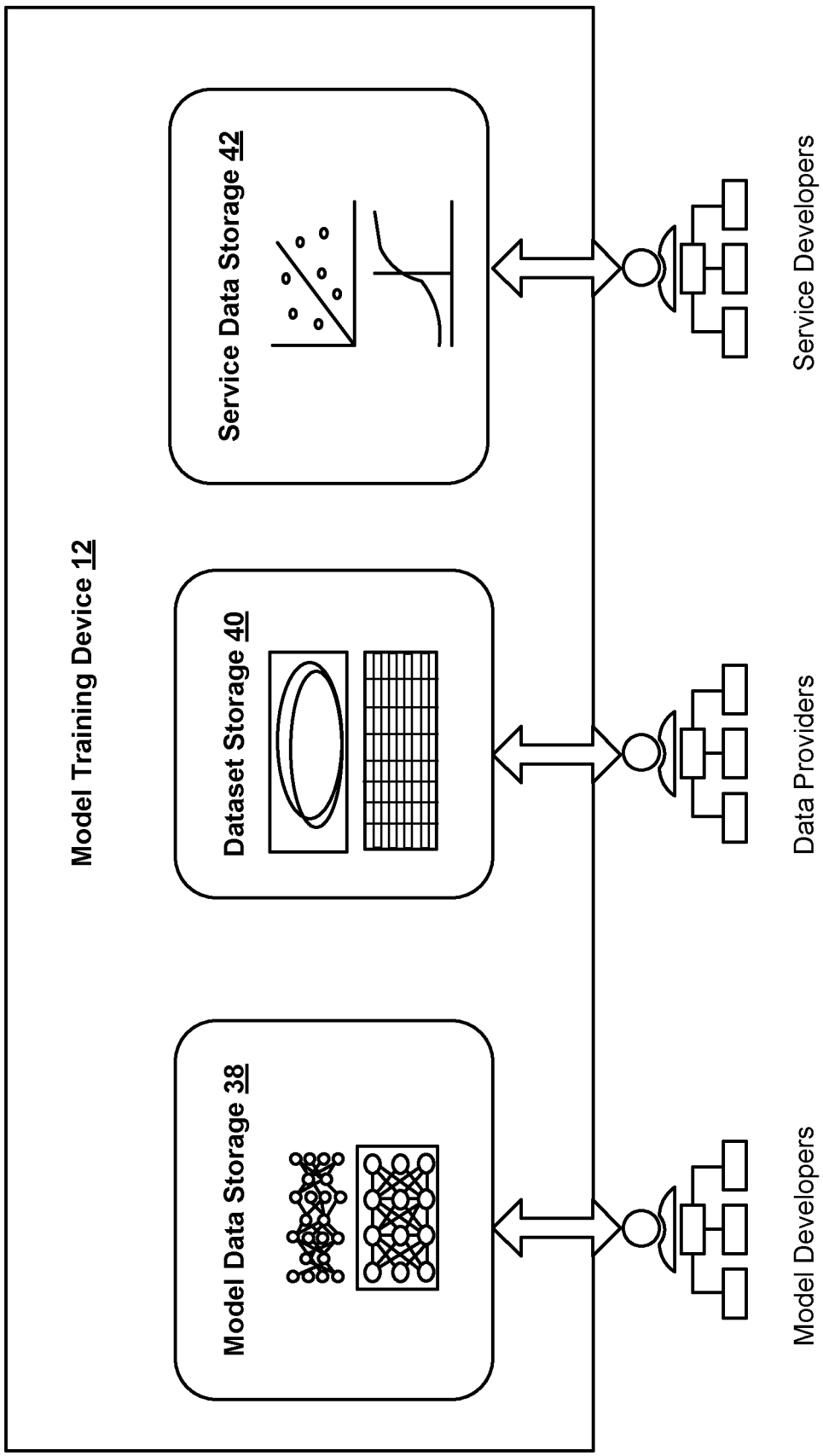

FIGS. 2A-2B, illustrate various features of the model training device 12. In FIG. 2A model training device 12 includes one or more processors 24, a memory 26, and/or a communication interface 28, which are coupled together by a bus 30 or other communication link. Those ordinarily skilled in the art will appreciate that model training device 12 may include other types and/or numbers of elements in other configurations which enable the features and functions described herein. The processor(s) 24 of the model training device 12 may execute programmed instructions stored in the memory 26 for the variety of functions described and illustrated herein. The processor(s) 24 of the model training device 12 may include one or more CPUs or general purpose processors with one or more processing cores.

The memory 26 of the model training device 12 may store programmed instructions for one or more aspects of the present technology as described and illustrated herein. However, some or all of the programmed instructions could be stored elsewhere, such as in the database server devices 14(1)-14(n), which can be accessed remotely by the model training device 12. A variety of different types of storage devices, such as random access memory (RAM), read only memory (ROM), hard disk, solid state drives, flash memory, or other computer readable medium which is read from and written to by a magnetic, optical, or other reading and writing system that is coupled to the processor(s) 24, can be used for the memory 26.

Figure 3:
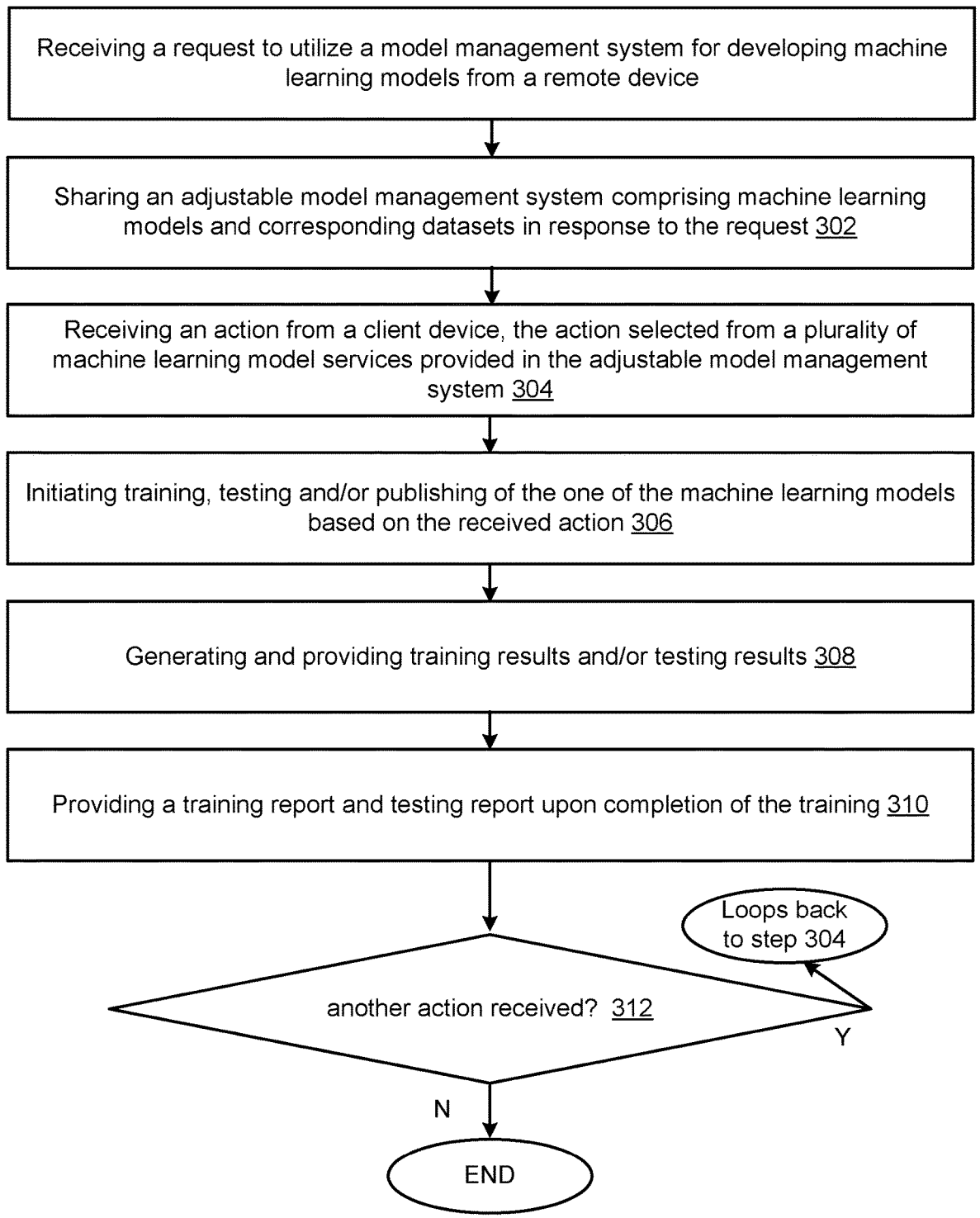
FIG. 3 is a flowchart of an exemplary method for initializing the exemplary model training device of FIG. 1

Accordingly, the memory 26 of the model training device 12 can store one or more applications that can include executable instructions that, when executed, cause the model training device 12 to perform actions, such as to transmit, receive, create, train, test and publish machine learning models, and to perform other actions described and illustrated below with reference to FIG. 3. The application(s) can be implemented as modules or components of other applications. Further, the application(s) can be implemented as operating system extensions, module, plugins, or the like.

The application(s) may be operative in a cloud-based computing environment. The application(s) can be executed within or as virtual machine(s) or virtual server(s) that may be managed in a cloud-based computing environment. Also, the application(s), and even the model training device 12 itself, may be located in virtual server(s) running in a cloud-based computing environment rather than being tied to one or more specific physical network computing devices. Also, the application(s) may be running in one or more virtual machines (VMs) executing on the model training device 12.

As illustrated in FIG. 2A, the memory 26 of the model training device 12 includes instructions for executing a graphical user interface (GUI) on a variety of client devices, a model data storage 38, a dataset storage 40, and a service data storage 42. The memory 22 may store a variety of instruction for implementing, for examples, policies, modules, databases, or applications carried about by model training device 12, contemplated by this invention.

The instructions for executing a graphical user interface (GUI) in this example allow users of client devices 16(1)-16(n) to interface with the various information stored, and organized in the model training device. For example, when executing the instructions to generate a graphical user interface (GUI) on the client device, a user of the client device may interact with a dashboard 400, as shown, for example, in FIG. 4A. The dashboard 400 provides an intuitive interface to enable users to, for example, train, control and manage machine learning models as described more fully herein. Further, the memory 26 may provide additional executable instructions for enabling a user at the client device to upload, for example, new trained machine learning models and new model input datasets, train a machine learning model, test a machine learning model, control access to a previously stored machine learning models and/or publish web service models via interaction with dashboard 400. When a user on a client device actuates a command (i.e. makes a request via the dashboard 400) the processor(s) 24 of the Model Training Device 12 may carry out the command or request.

A user at a client device 16(1)-16(n) may upload machine learning models coded in Python via the dashboard 400 (as shown in Figure), and the model training device 140 thereafter may store the machine learning models via the Python data storage 38. The service module 34 stores the received machine learning models from the client devices 16(1)-16(n) in the model data storage 38, in the form of, for example a table, database, structured data structure, unstructured data structure or other data structure. The service module 34 may also receive a model input dataset from client devices 16(1) to 16(n) and store into model dataset storage 40;

the model data input set that including a training dataset and a testing dataset. The training dataset and testing dataset are utilized to train and test the machine learning models.

The communication interface 28 of the model training device 12 operatively couples and enables communication between the model training device 12, the database server devices 14(1)-14(n), and/or the client devices 16(1)-16(n), which are all coupled together by the communication network(s) 18 and/or direct connections, although as previously described, other types and/or numbers of communication networks or systems with other types and/or numbers of connections and/or configurations to other devices and/or elements may also be used.

An exemplary method of improved model training will now be described with reference to FIGS. 1-4S. Referring to FIG. 3, an exemplary method for creating and sharing machine learning based web service models by the model training device 12 is illustrated. In step 300, the model training device 12 receives a request for utilizing an adjustable management system from a client device 16(1)-16(n). The request may be a request to open a model training application providing the user access to the adjustable management system (which may be a virtual application or an application downloaded on one of the client device(s)) that provides the user access to data stored and organized by the model training device.

Figure 4A:
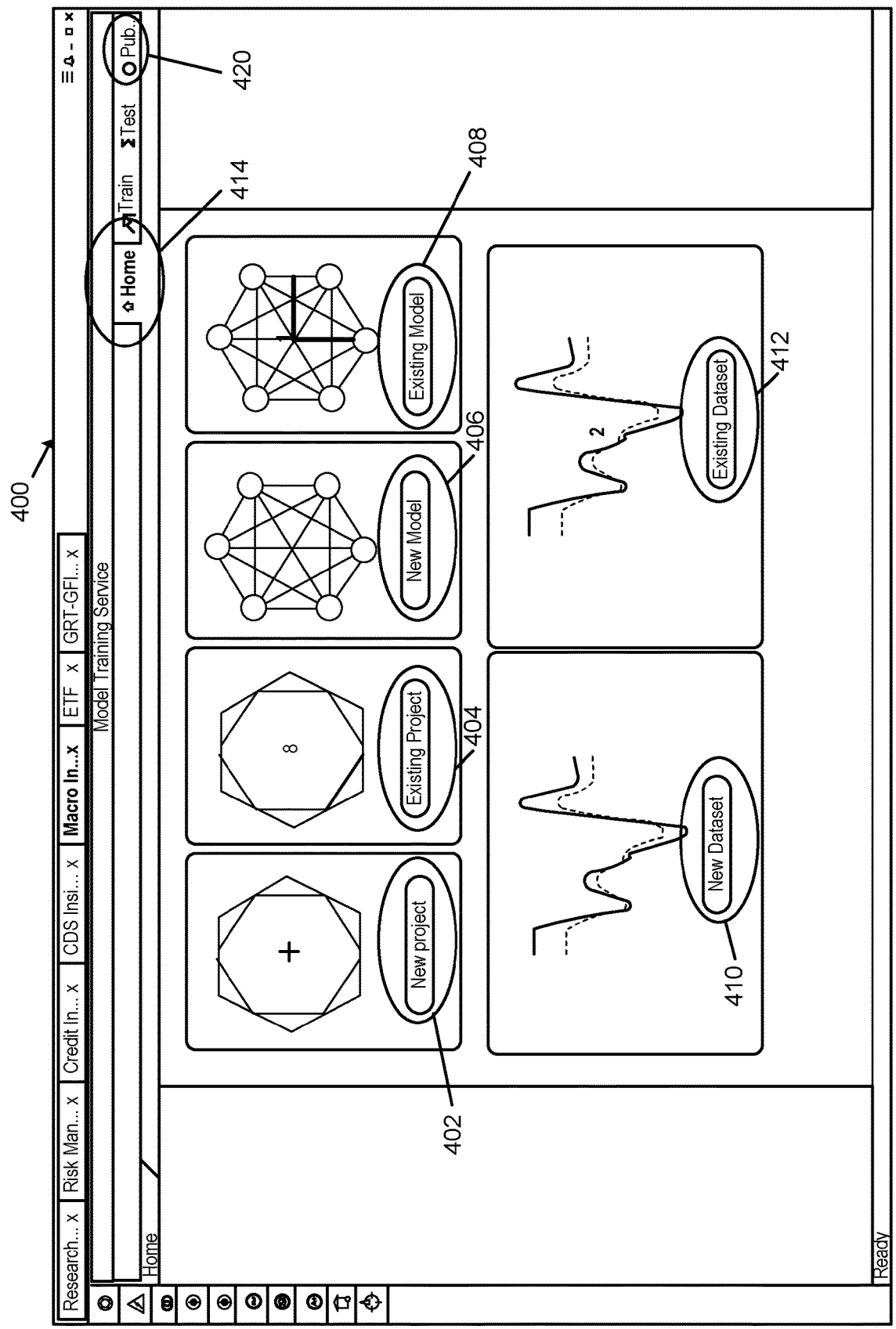
FIGS. 4A-4S illustrates a model management system provided by the model training device of FIG. 1.
Figure 4B:
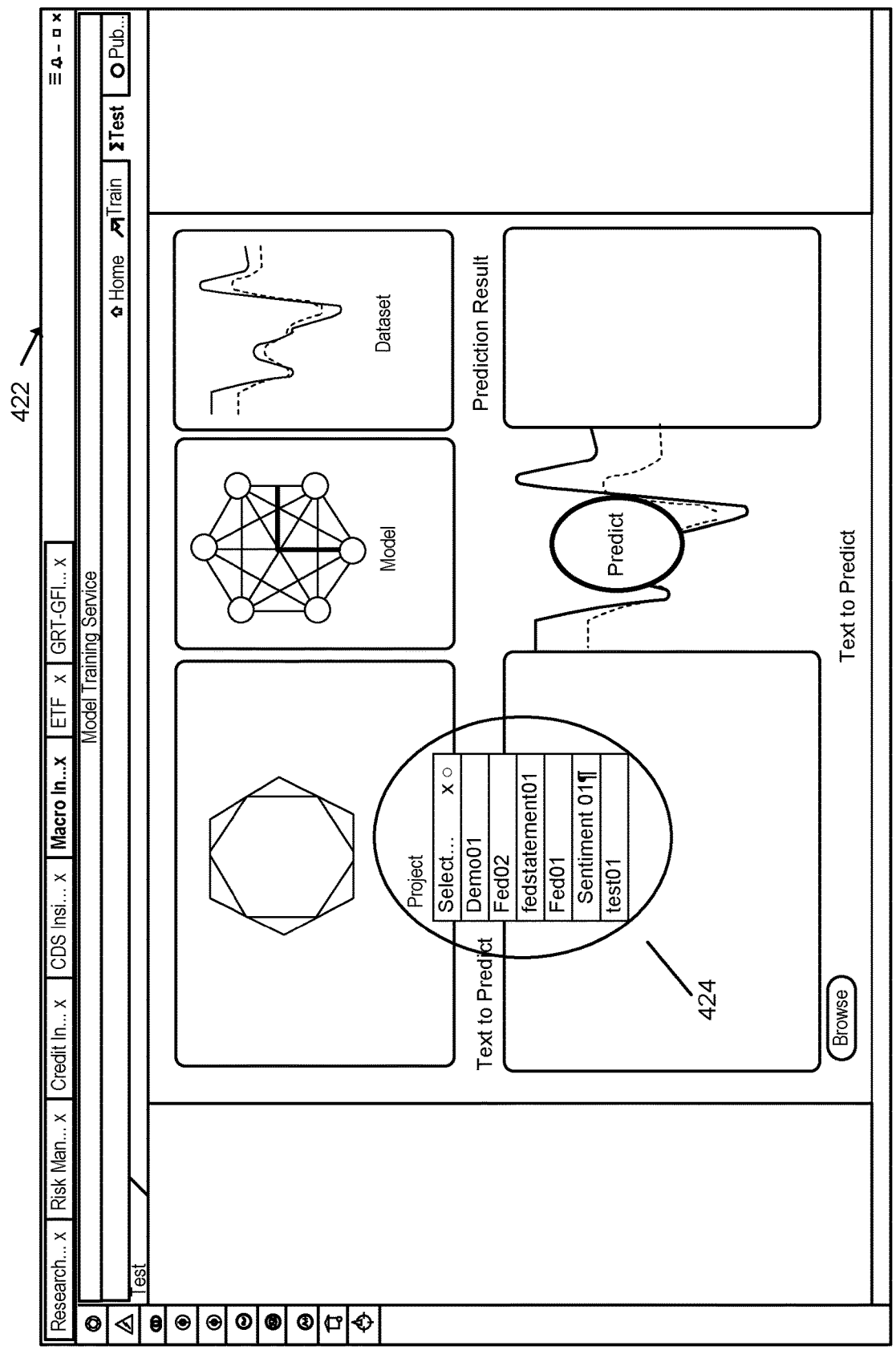
Figure 4C:
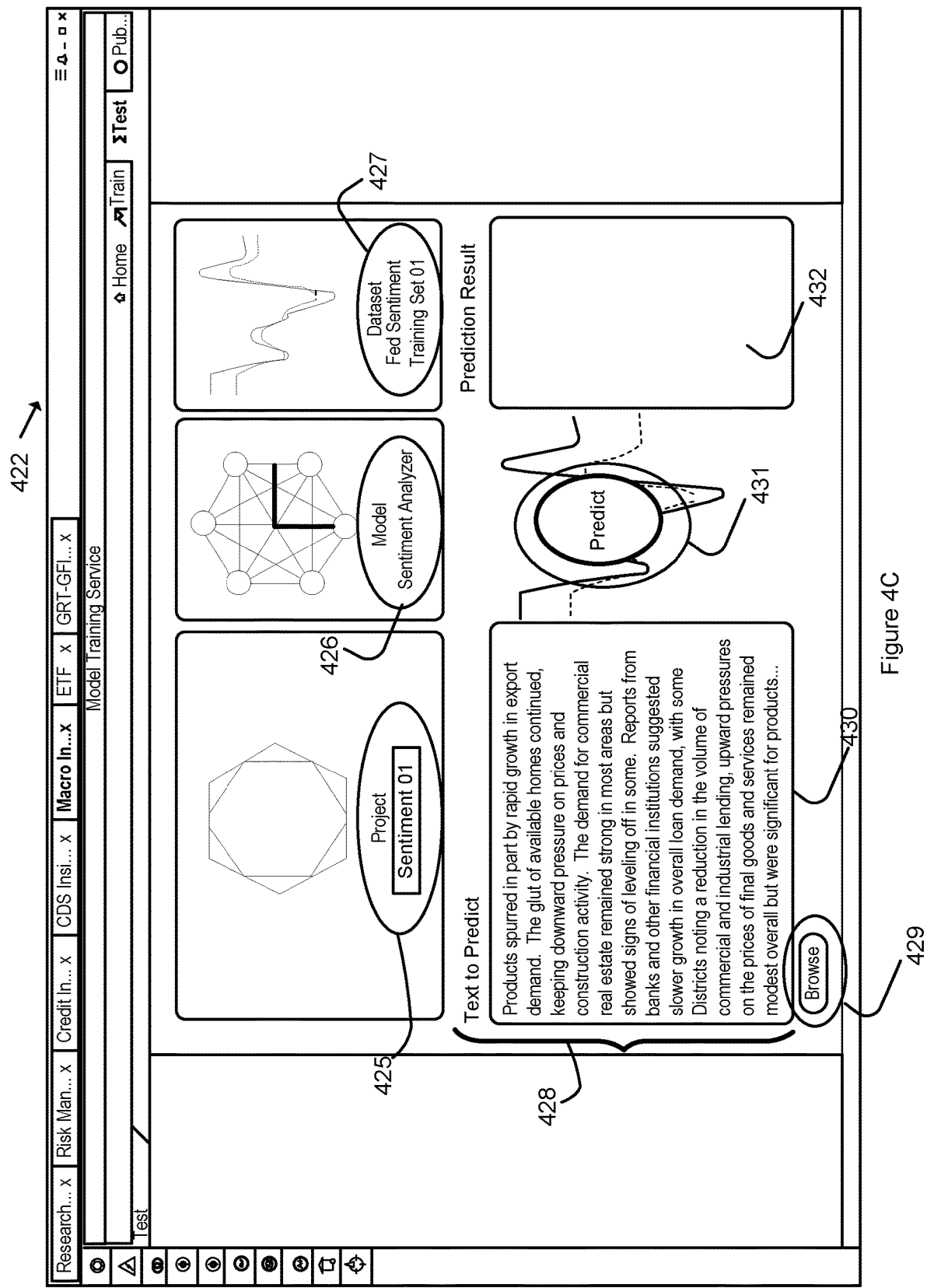
Figure 4D:
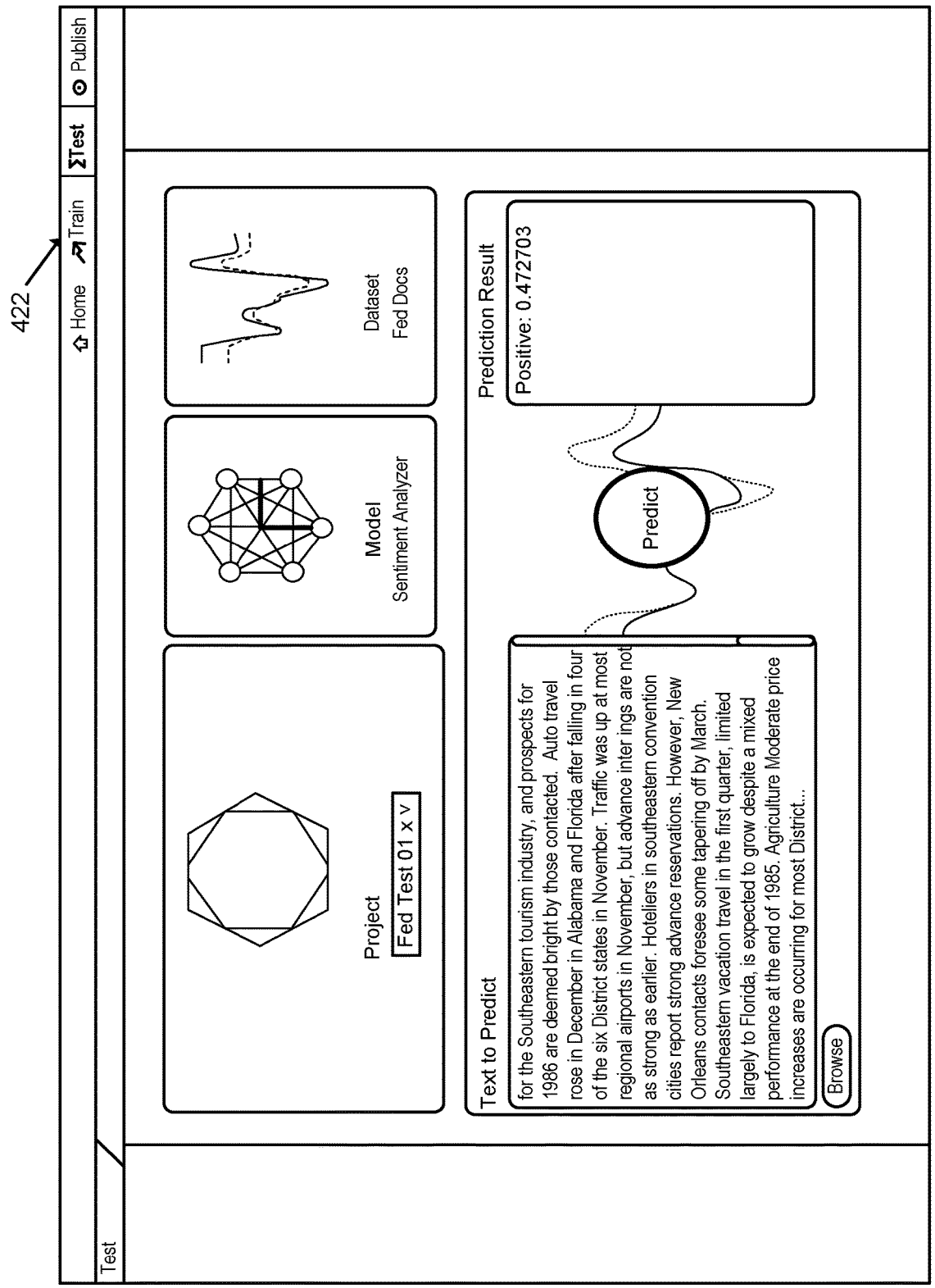
Figure 4E:
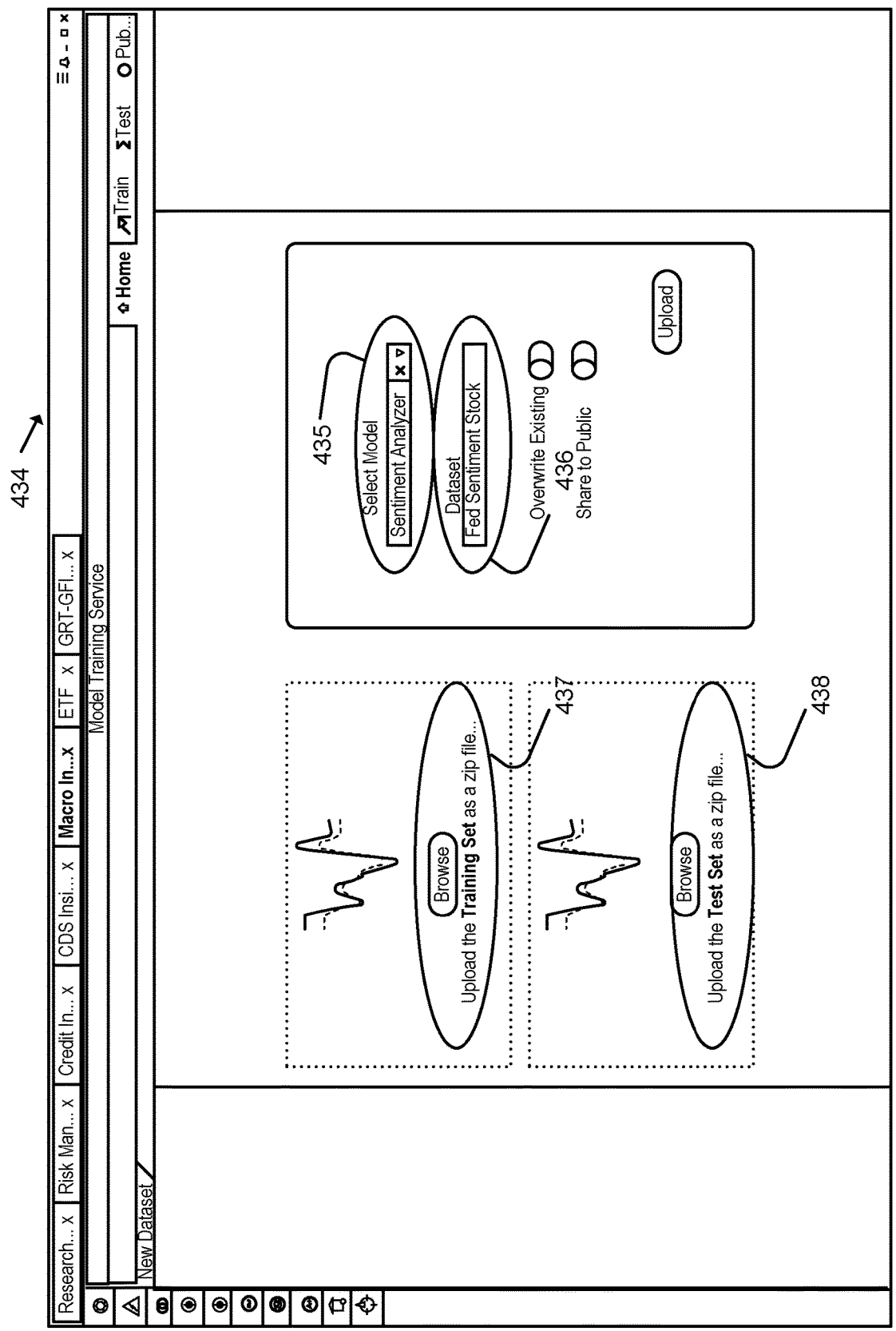
Figure 4F:
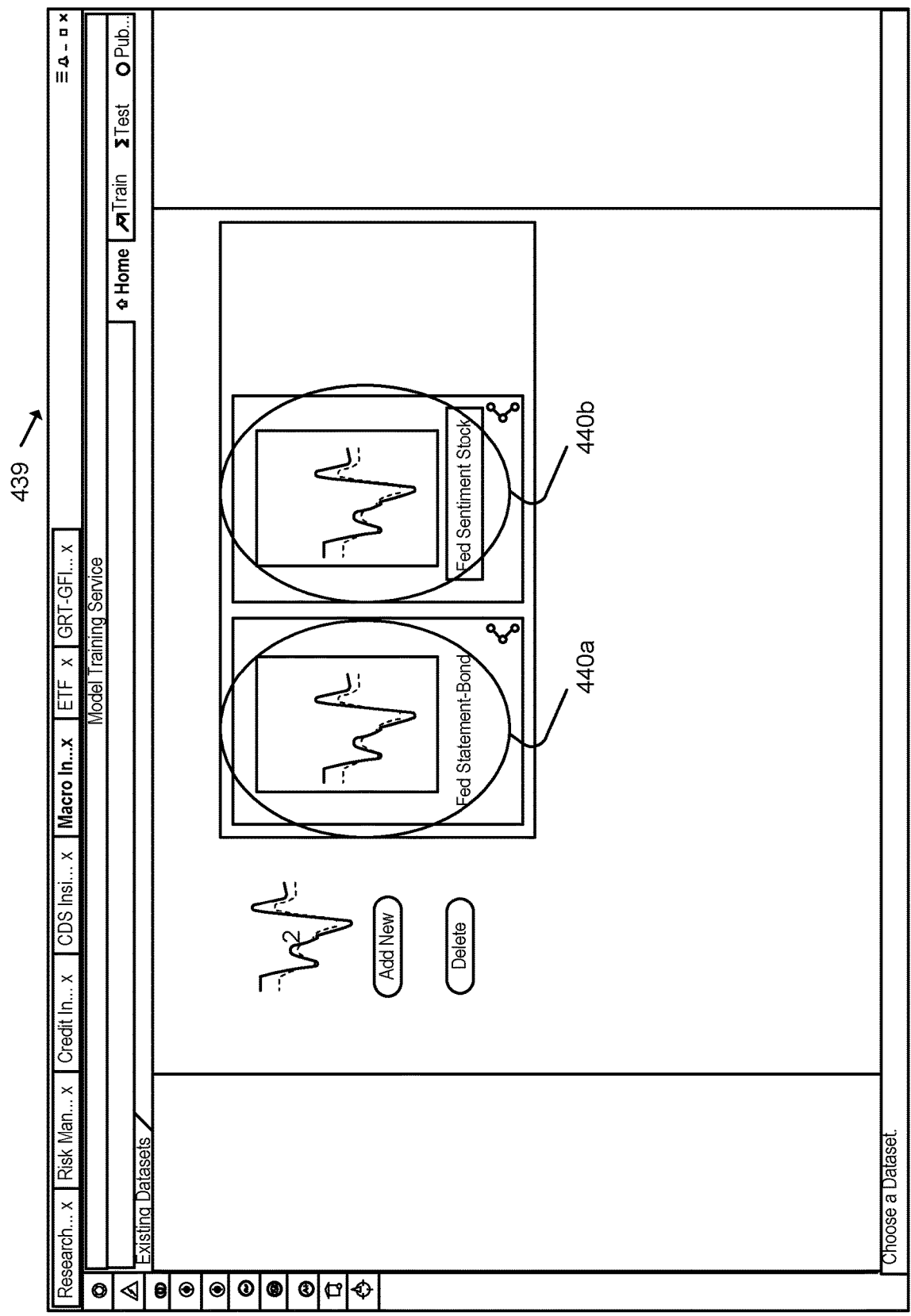
Figure 4G:
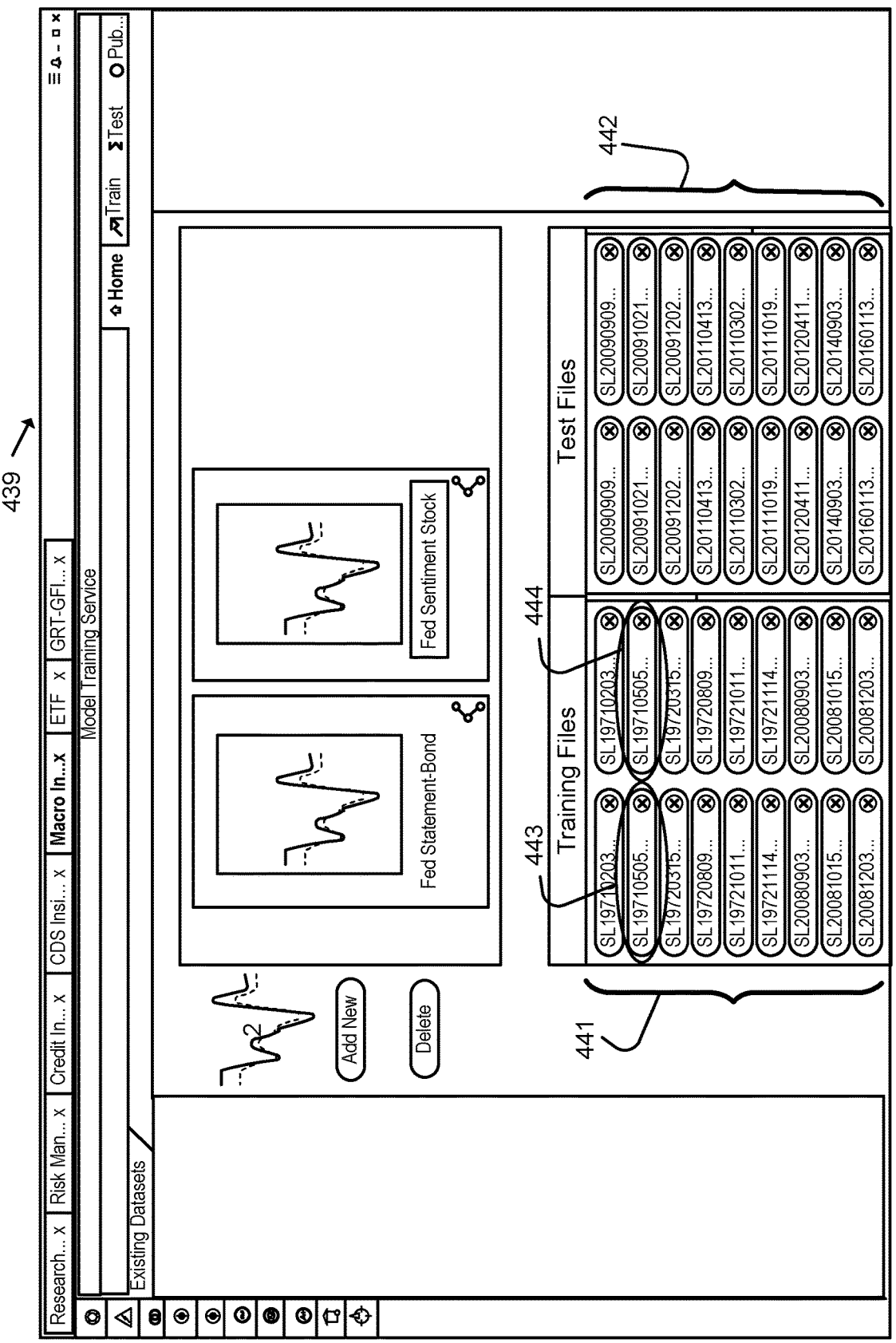
Figure 4H:
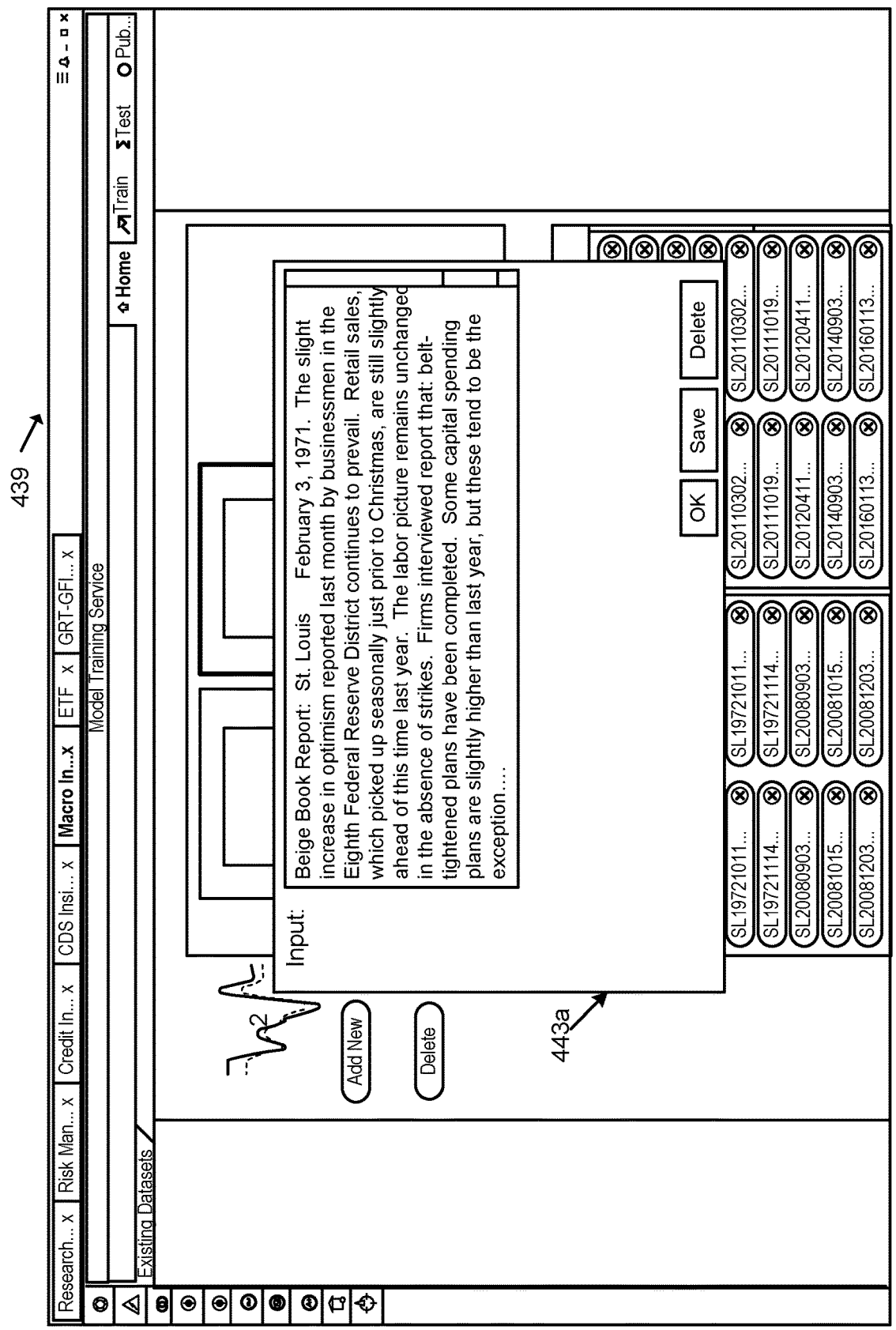
Figure 4I:
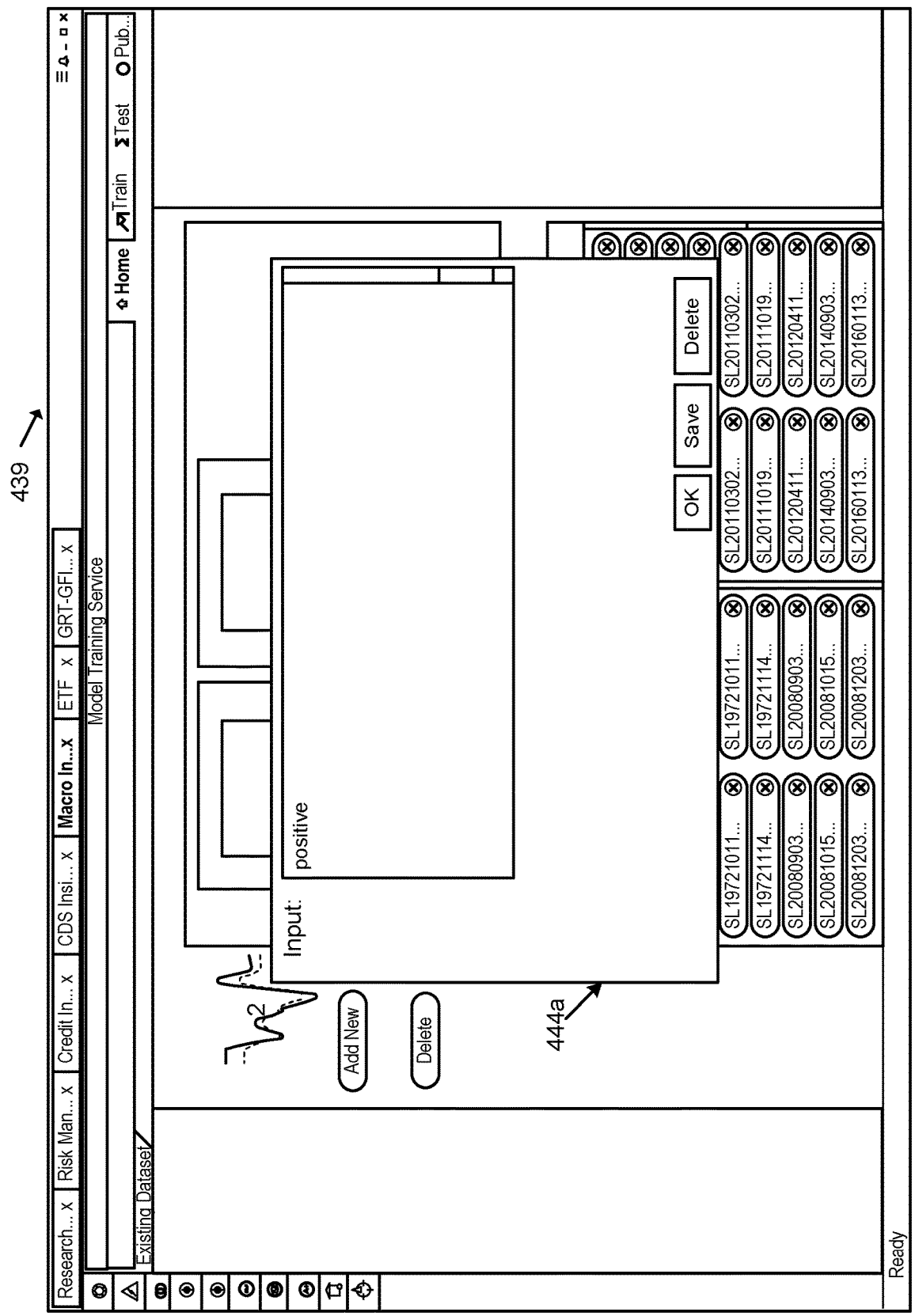
Figure 4J:
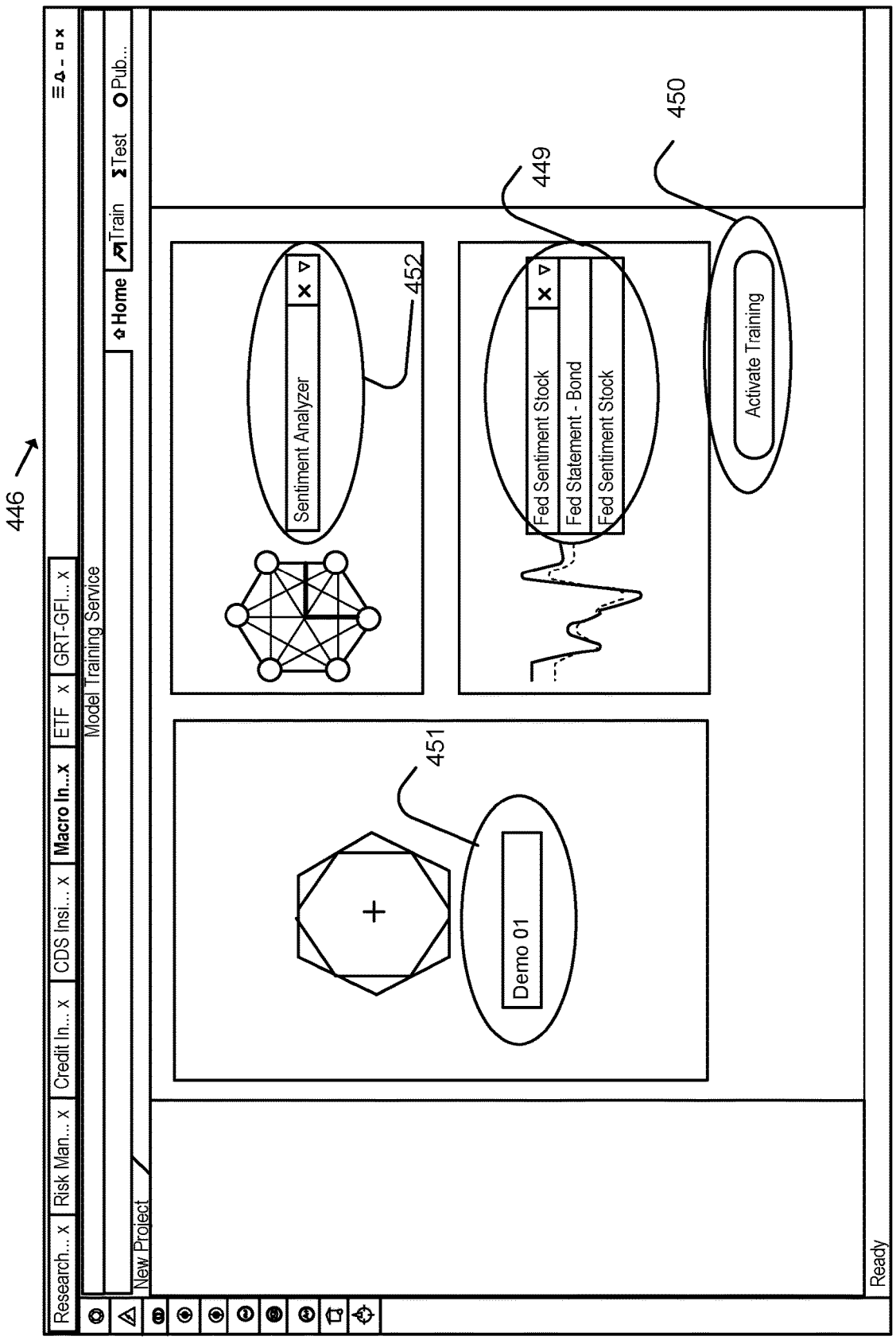
Figure 4K:
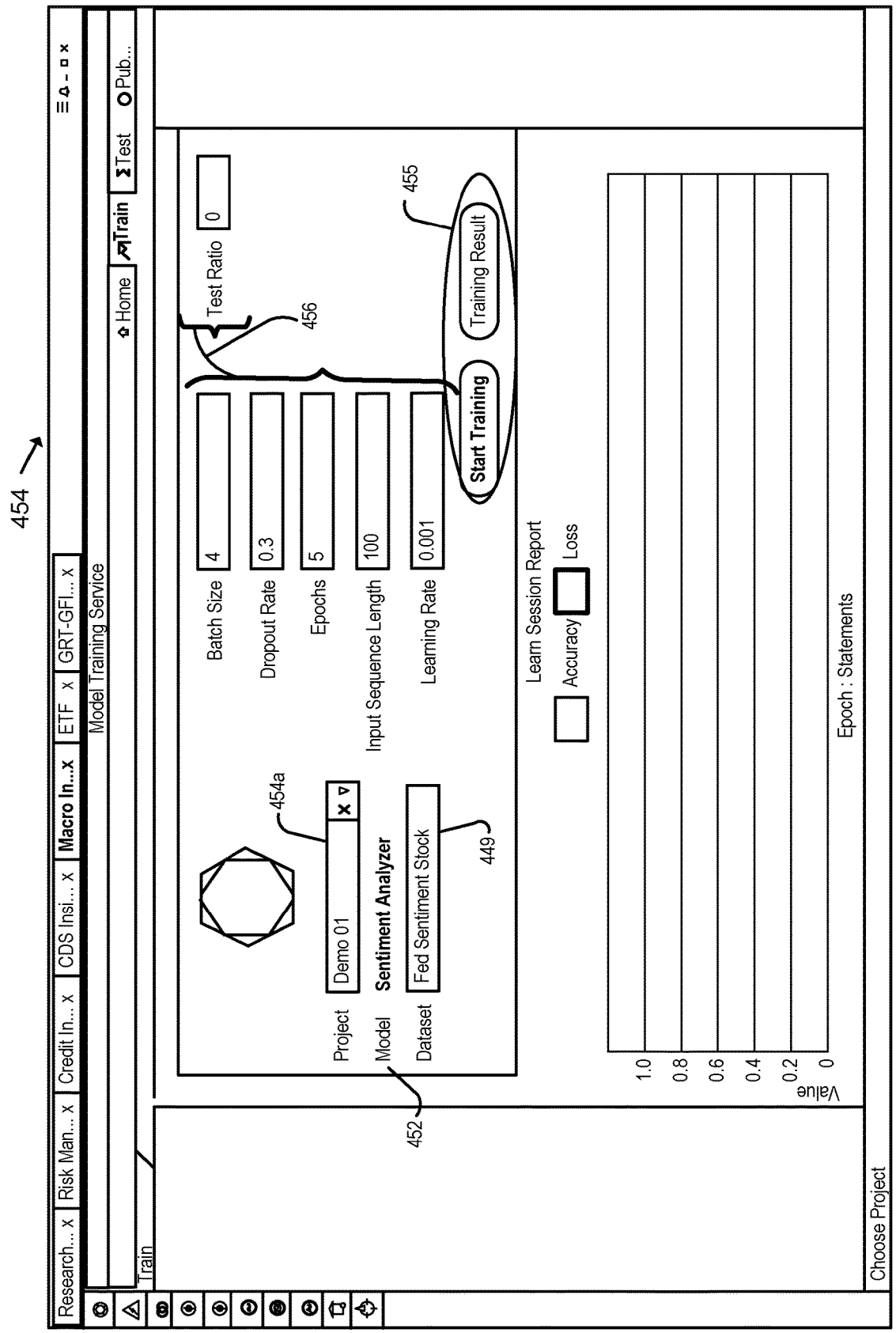
Figure 4L:
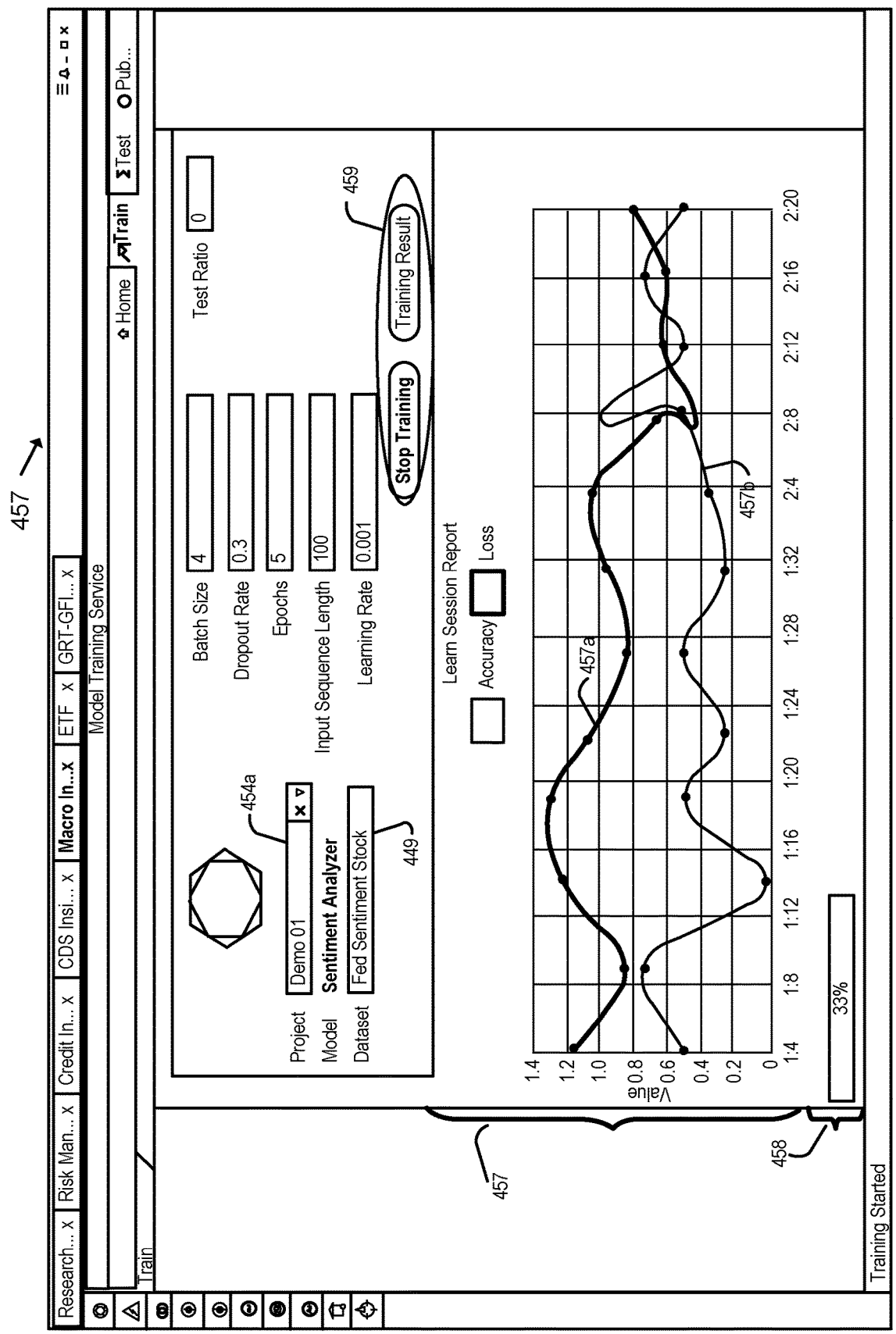
Figure 4M:
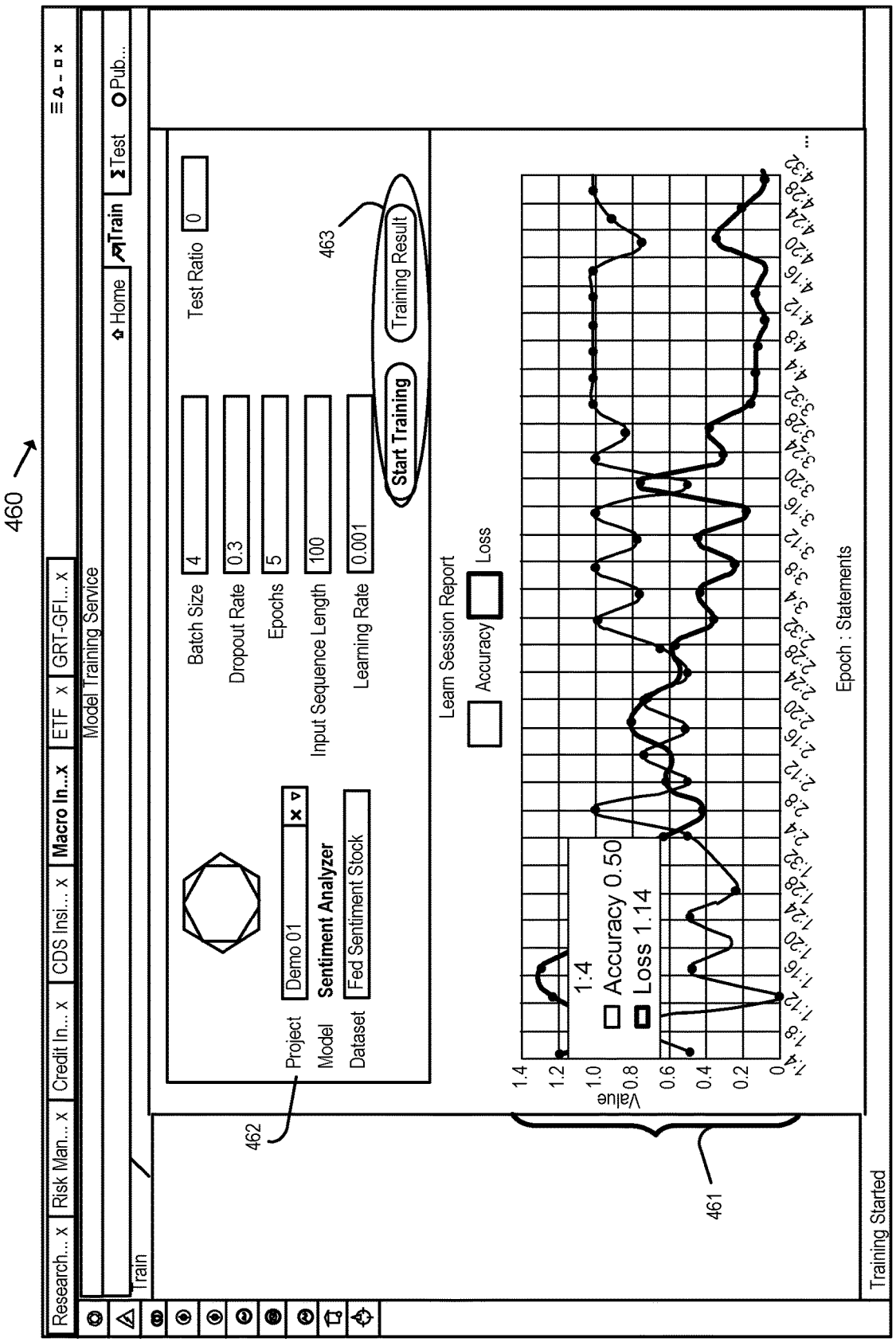
Figure 4N:
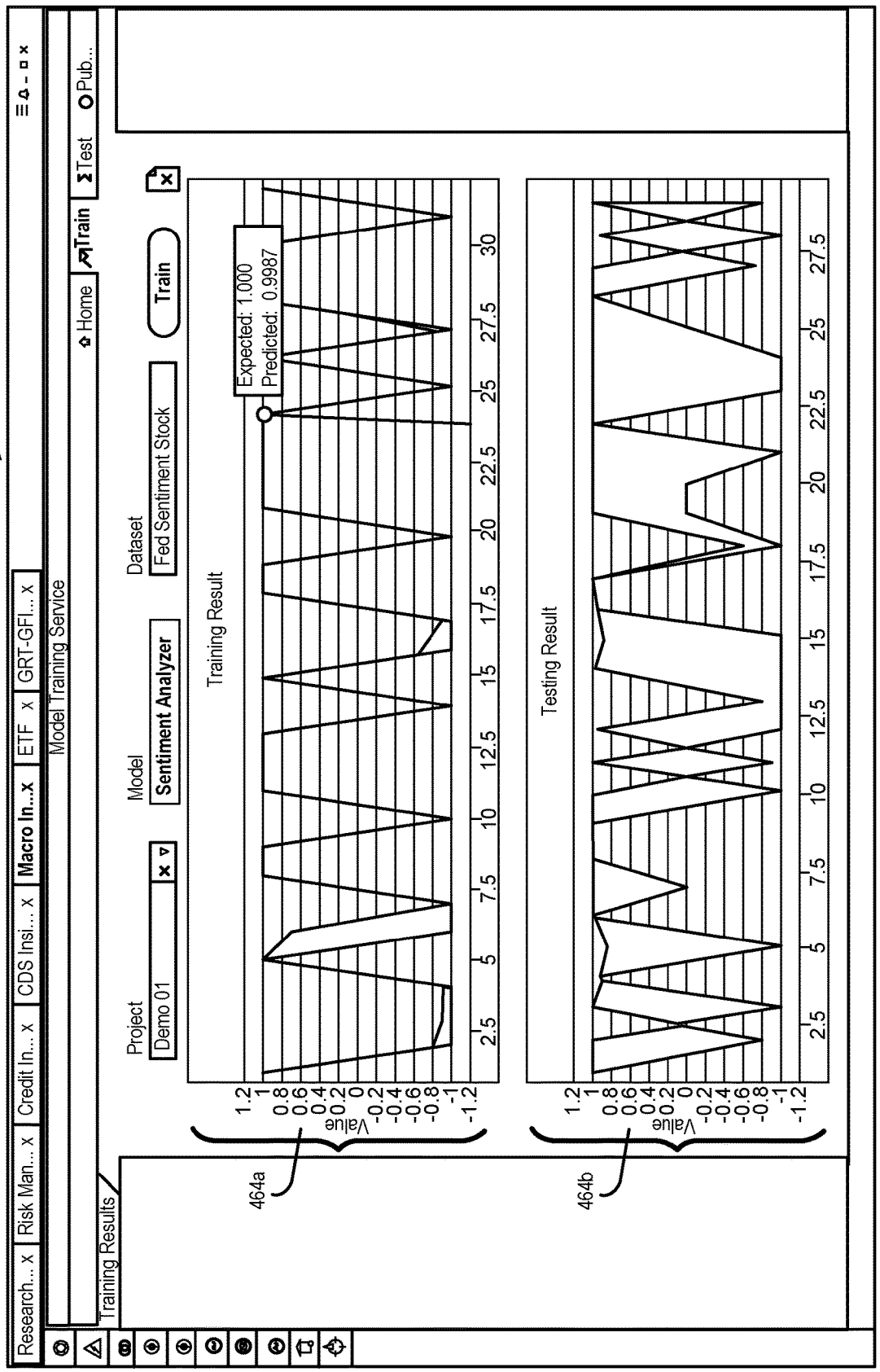
Figure 4O:
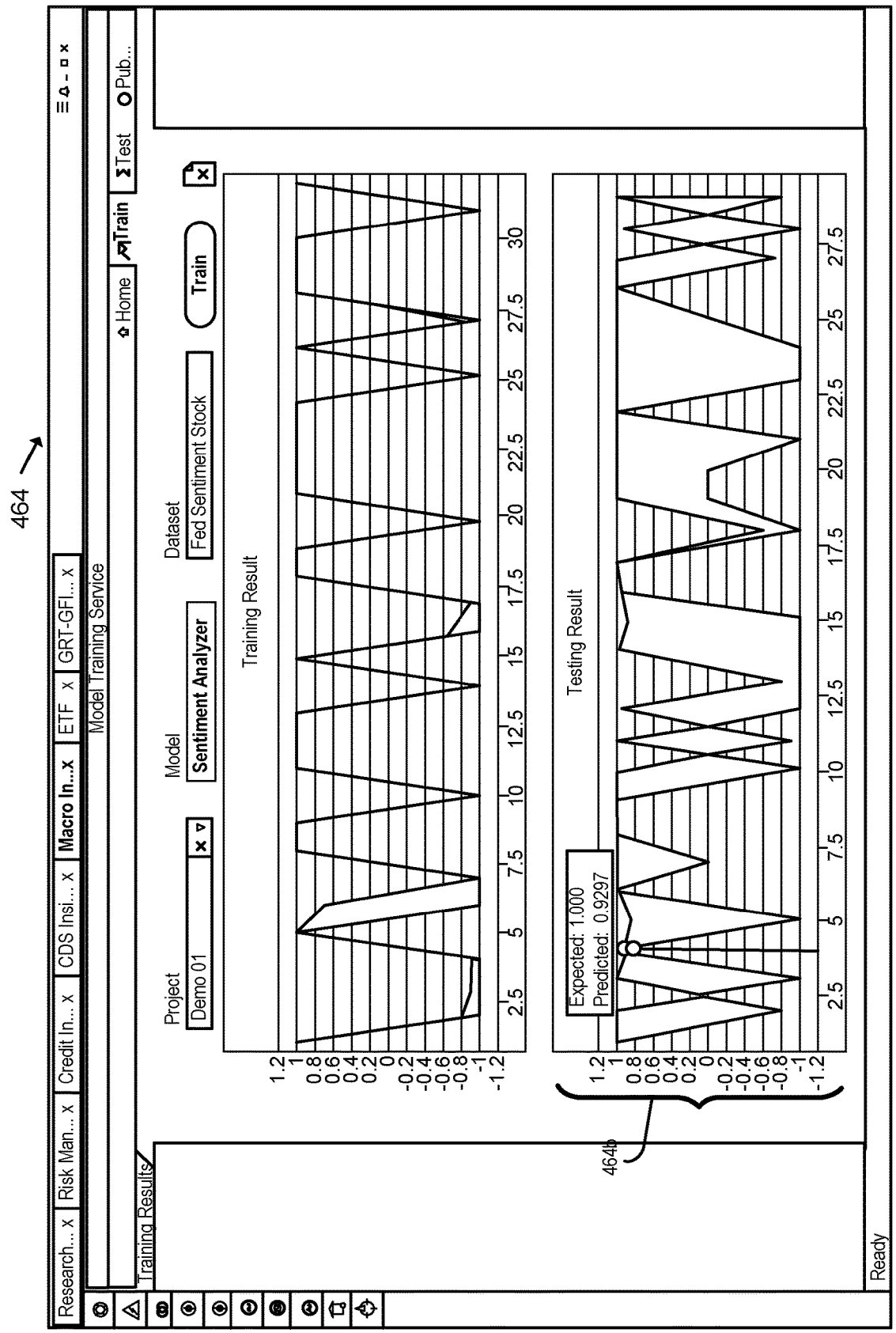
Figure 4P:
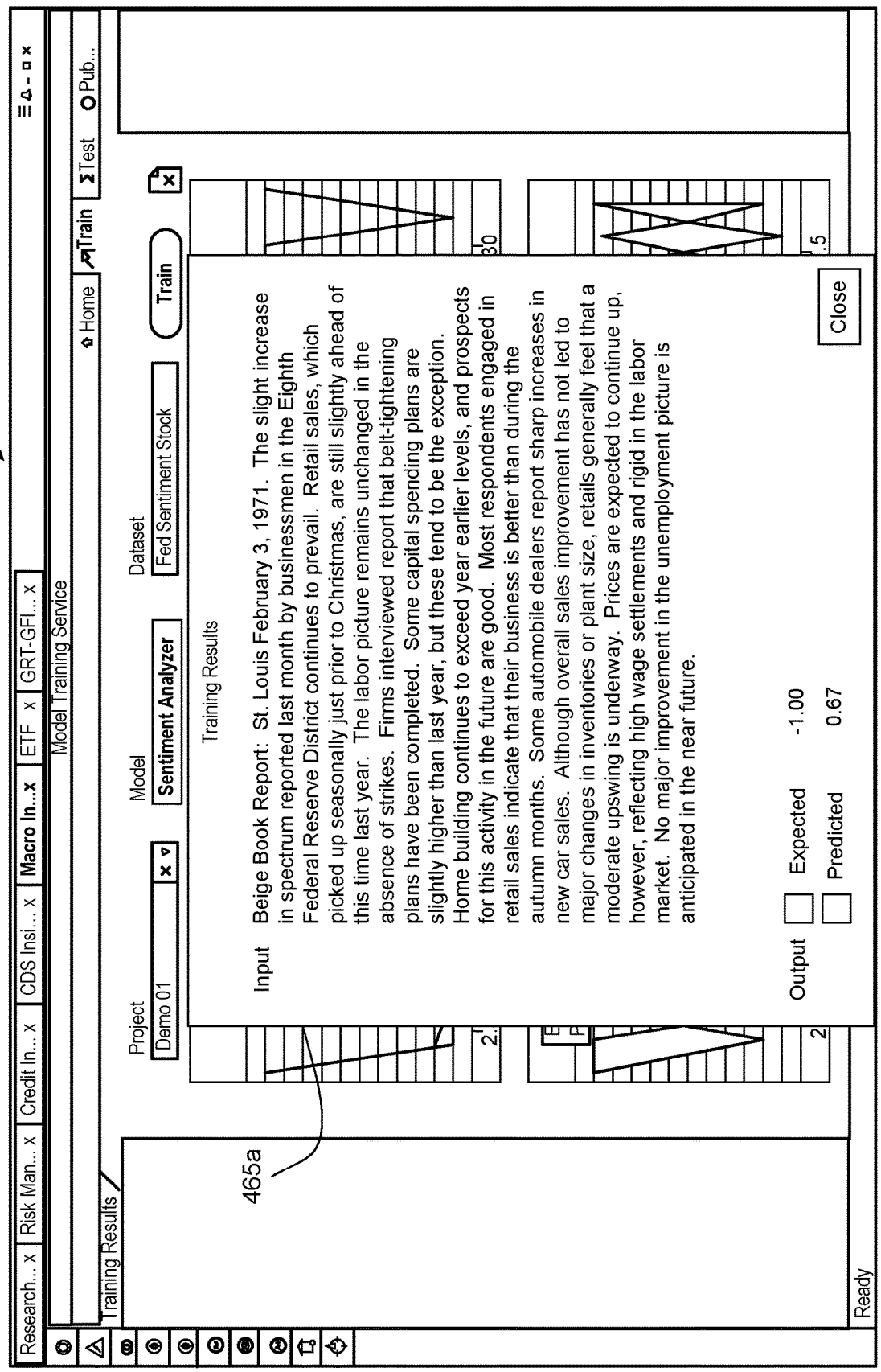
Figure 4Q:
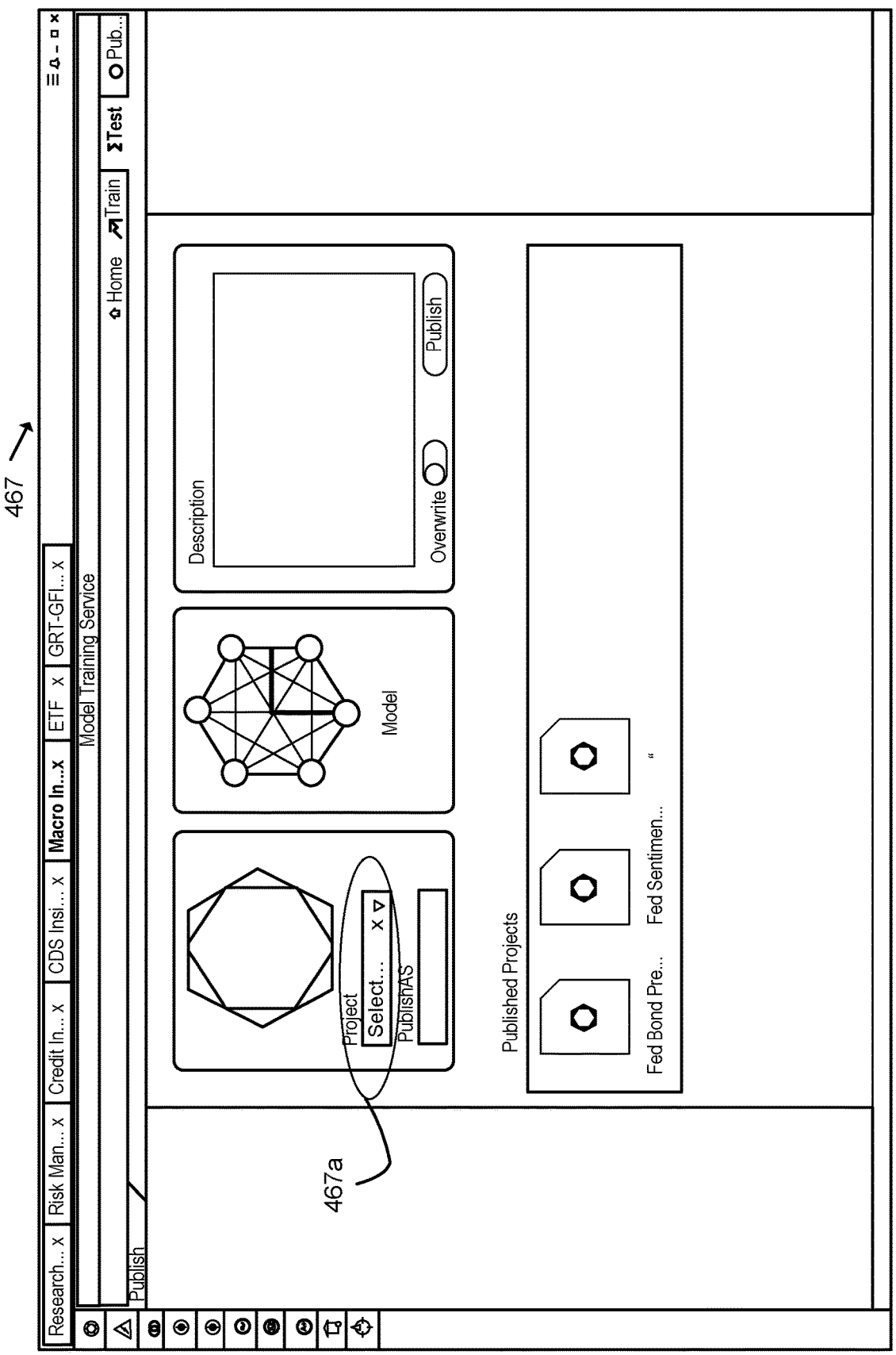
Figure 4R:
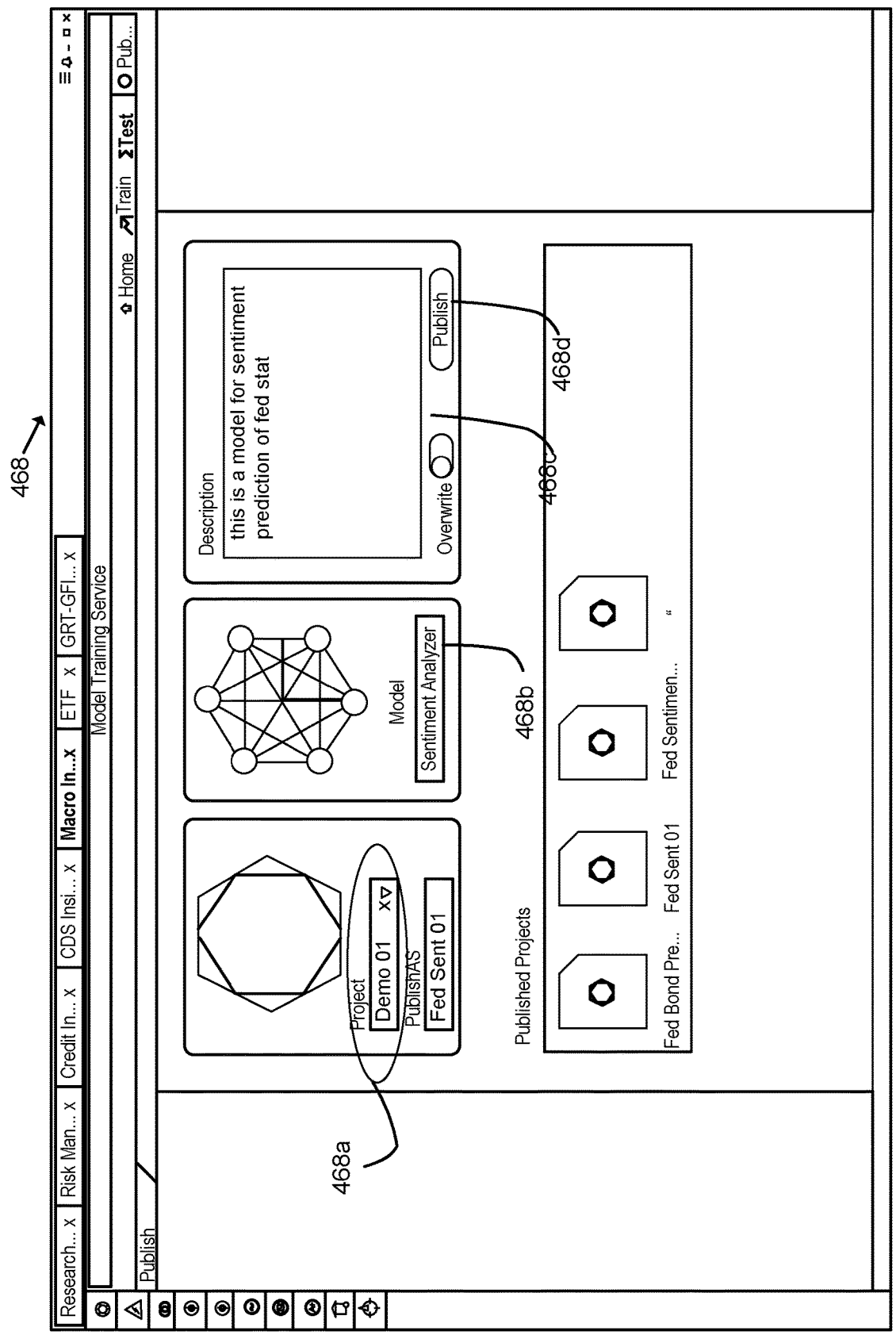
Figure 4S:
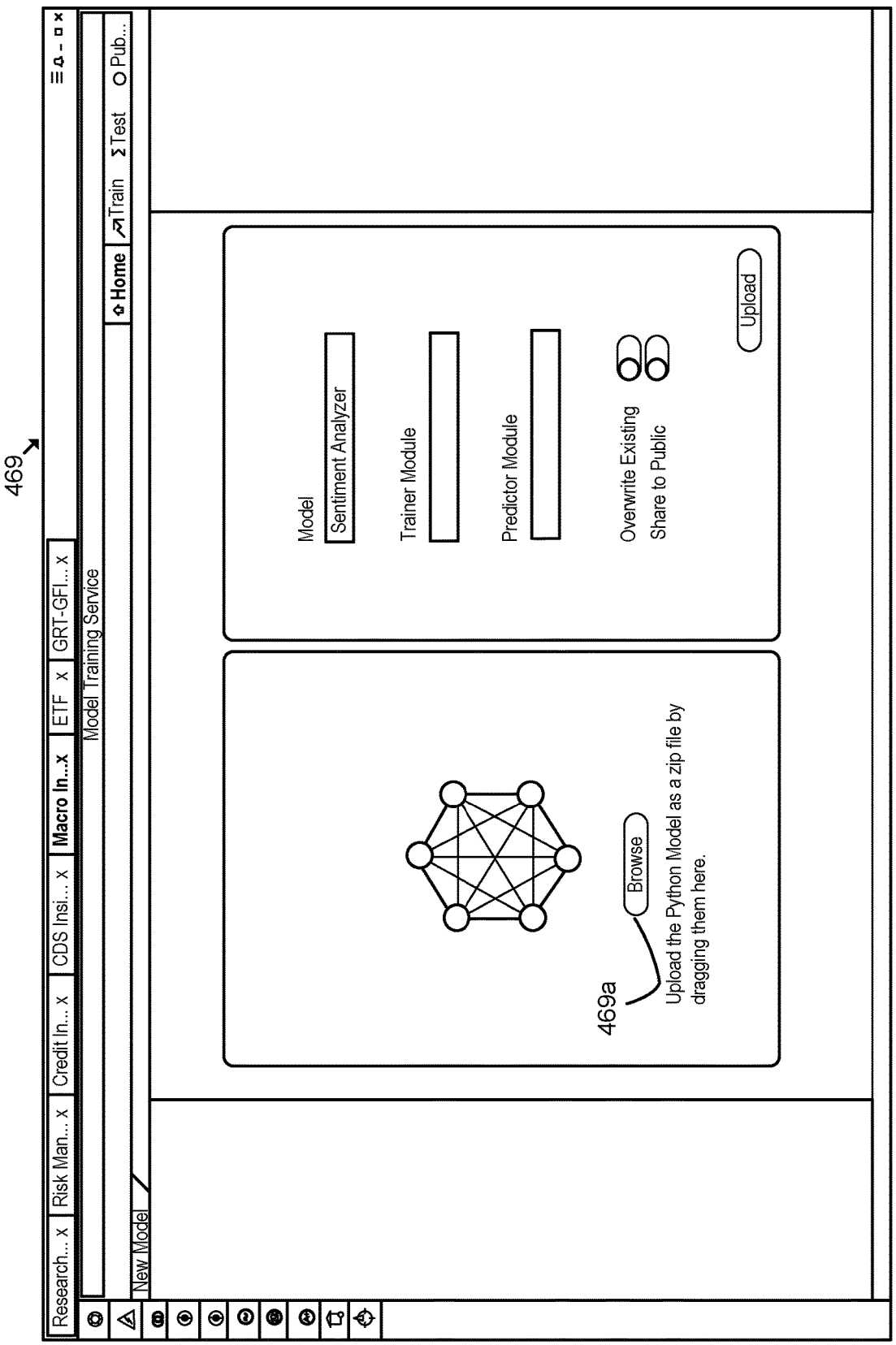

In step 302, the model training device 12, shares various GUIs to the client devices 16(1)-16(n) (as illustrated in FIGS. 4A-4S), that enable a user to select, and test, a plurality of machine learning models and datasets in response to the request. As used herein, the various GUIs generated by the model training device 12, and shared to the user at the client devices 14(1)-14(n) is referred to as an adjustable model management system. In step 302, the adjustable model management system is shared with the client devices 16(1)-16(n) via the communication networks 18. The adjustable model management system may include a model training dashboard 400 shown in FIG. 4A including a plurality of machine learning model services 402-420. The plurality of machine learning model services may include user acceptable graphical objects, including new project service 402, existing project service 404, new model service 406, existing model service 408, new dataset service 410, existing dataset service 412, training service 416, testing service 418 and publish service 420. These service provide a user access to a plurality of functions relating to creating, testing, uploading, and sharing, machine learning models and datasets stored in the memory of the model training device 12 (or database server device(s) 14(1) to 14(n)). By way of example, the model training device includes a sentiment analyzer model, a document clustering model, and a time series predication model stored in memory. By implementing the various features of the present invention, the user may intuitively test the quality of the sentiment analyzer model by testing it against already validated input test data (such as a publications) already stored and organized in the client service device. Alternatively, the user can use an optimized sentiment model to validate test data input by the user.

In step 304, the model training device 12 receives an action from a client device, the action selected from a plurality of machine learning model services presented on a GUI of the adjustable model management system (such service are depicted in FIG. 4A). The received action may include selecting the new project service 402, selecting the existing project service 404, selecting the new model service 406, selecting the existing model service 408, selecting the new dataset service 410, selecting the existing dataset service 412, and/or selecting the publish service 420. The model training device 12 executes these received actions as described in detail below.

The received action may include selecting the new dataset service 410 (as shown in FIG. 4A). If selected, a user may upload a new dataset (which may have previously been stored locally on the client device) to the data storage 40. In this example, the model training device 12 may provide the user interface 434 shown in FIG. 4E to the client device, which includes a "Browse" button 437 to upload training dataset files, "Training Set" and further includes a "Browse" button 438 to upload a plurality of testing dataset files "Test Set". The training set and the test set together form the new dataset. The new dataset is then stored by the model training device 12 in the dataset storage 40. Further, the user of one of the client devices 16(1)-16(n) may name the test and training datasets respectively, using input box 436. Each of the training set 441 and the test set 442 includes a plurality of pairs of input files and target files. In this example, one of the plurality of pairs includes the input file 443 and the target file 444. For a pair of input file and target file, the input file includes a set of text and/or words provided as input and the corresponding target file includes an output indicating whether the input is positive or negative. In this example, the input file 443 includes a set of text and/or words 443a provided as an input and the corresponding target file 444 includes an output to the test file 443 of positive 444a. By providing an output in the target file for an input file the machine learning model is able to be trained to predict what output should the machine learning model predict based on the dataset inputted. This new dataset Fed Sentiment Stock 440 is utilized for training and/or testing of machine learning models.

Input test data (i.e. "Test Set" 438 data shown in FIG. 4E) is any data used for training the machine learning models (i.e. algorithms) so that the quality of machine learning models can be tested to ensure that the model works. In contrast a training data (i.e. "Training Data" 437 data shown in FIG. 4E) is any data used to train/create a machine learning model. It is important to keep the input test data separate from the training data because testing a machine learning model with the very data which was used to train and create it does not reliability indicate the model is working. The embodiments described herein advantageously provide an organized interface for storing and retrieving both input testing and training data so to eliminate the risk noted above. Both input testing and training data may otherwise look undisguisable, and may include for example publications, such as websites, eBooks, news articles, hospital records.

In another example, the received action may include selecting the existing dataset service 412 (as shown in FIG. 4A). This action enables the user at the client device to access previously stored datasets in the dataset storage 40. In this example, the model training device 12 executes the received action of selecting the existing dataset service 412, by providing a user interface 439 shown in FIG. 4G. The user interface displays a list of stored datasets, such as "Fed Sentiment-Bond" 440a and "Fed Sentiment Stock" 440b. The user is thus able to access stored datasets 440a and 440b for training and/or testing of machine learning models during development and optimization. As compared to conventional systems, this feature advantageously enables a user to access already validated data sets for both training, and ensuring the quality of machine learning models during the development cycle.

In another example, the received action may include selecting the new model service 406. This action enables the user at the client device to add a new machine learning model to a list of plurality of machine learning models previously stored in the model data storage 38. In this example, the model training device 12 executes the received action of selecting the new model service 406, by providing a user interface 469 shown in FIG. 4S. The user interface includes a user actuatable browse button 469a that may be utilized to upload a new machine learning model file into the adjustable model management system. The new machine learning model file may be coded in Python computer programming language, although any other type of computer programming language coded machine learning models can be included. Once a new model has been uploaded, the user can, for example, train the uploaded model with preexisting datasets stored in the model training device, or the user can load new datasets to train the model.

In another example, the received action may include selecting the new project service 402. This action enables a user at a client device to create a new web service application that includes a machine learning model and a dataset stored in the model training device 12. In this example, the model training device 12 executes the received action of selecting the existing project service 404, by providing the user interface shown in FIG. 4J to the user's client device. The user has the advantage of initiating a project by selecting a machine learning model "Sentiment Analyzer" 452 and a dataset "449" to perform testing and training of the selected machine learning model 452. A user may assign a particular project identifier 451 to each project. The projects are stored in the service data storage 40 with their associated project identifier. Once a project is completed, the trained model can be published as a web service without any additional coding, thus reduce the time to market for the model and reduce any potential risk introduced by productionizing the model with transitional process.

In another example, the received action may include selecting the existing project service 404. This action enables a user at a client device to continue testing and/or training machine learning models which are already saved in the model training device, and assigned with an existing project identifier. In this example, the model training device 12 executes the received action of selecting the existing project service 404, by providing a user interface 422 shown in FIGS. 4B-4C that includes a list of project identifiers 424 stored in the service data storage 40. A user at the client device may select one of the plurality of project identifier 425 from the list of project identifiers 424 to perform testing of the input test data based on the machine learning model 426 and dataset 427 associated with the selected project identifiers 425. Upon completion of the testing and training of the input test data the project can be published over the communication network 18.

In another example, the received action may include selecting the publish service 420. This action enables a user at a client device to publish a machine learning model. In this example, the model training device 12 executes the received action of selecting the publish service 420, by providing a user interface 467 shown in FIGS. 4Q-4R that includes a drop down list 467a. The drop down list 467a includes a plurality of project identifiers 468a. Each of the plurality of projects identifiers 468a includes a machine learning model and its corresponding dataset. Upon a selection of one of the projects identifiers 468a from the list of plurality of projects identifiers a user may select and choose which of the projects to publish (i.e. enable other client devices have access to). Traditionally productionizing a trained model is burdensome because it requires a technology team to setup a new environment and create a service that make the model available to other users or applications. Replicating training environment for production is no easy task given the large amount of libraries used and version differences. Potential issue due to minor version difference might not be obvious, but might cause significant damage in certain conditions. Making a seamless training/publication process removes such burden and potential risk.

In another example, the received action may include upon selecting the existing model service 408 to validate any input test data using one of a plurality of machine learning models previously stored in the model data storage 38. In this example, the model training device 12 executes the received action by providing a user interface 422 shown in FIGS. 4B-4C to the client device that includes a list of project identifiers 424 stored in the service data storage 40. A user at the client device then may select one of the plurality of project identifiers (e.g. project identifier 425). Upon selection of the one of the project identifier 425 the testing user interface 422 is updated to display the corresponding existing machine learning model 426 and a corresponding dataset 427 associated with the selected project identifiers 425. In order to validate any input test data, the model training device 12 advantageously allows the user at the client device to select and utilize machine learning models previously trained. As shown in FIGS. 4B-4C, the user is provided with machine learning model 426 (a "Sentiment Analyzer" model as shown in FIG. 4B) that has been previously trained using the model input dataset 427 (a "Fed Sentiment Training Set 01" shown in FIG. 4B). The machine learning model 426 is used to perform validating of the input test data to predict, for example, a topic associated with the input test data and advantageously can be used to ensure the test input data is valid for other purposes (such as training other machine learning models).

In step 306, the model training device 12, initiates training, testing and/or publishing of the one of the machine learning models based at least on the executed at least one received action.

In step 306, for example, the model training device 12 may initiate training of a machine learning model based the received action of selecting the new model service 406 and new dataset service 410. With reference to the user interface of FIGS. 4K-4O, a user may select a particular machine learning model (e.g. "Fed Sentiment Analyzer" 452 shown in FIG. 4K) and a dataset ("Fed Sentiment Stock" 449 shown in FIG. 4K) and then actuate an "Activate training" button 450 to provide a training initiation request. As a result of the user actuation the model training device 12 initiates training of the selected machine learning model 452 based on the selected dataset 449. The machine learning model and datasets may have been loaded by the user of the client device, or may be previously stored on the model training device 12 by another user.

As shown in FIG. 4L, after actuating the "activate training" button, the user may additionally adjust one or more training parameters 456 before training commences. The training parameters 456 include batch size, dropout rate, epochs, input sequence length, learning rate and/or test ratio, although any number and/or types of input parameters may be included. The batch size is a parameter that is utilized to control a number samples used for learning at a time. The dropout rate is a parameter that controls a number of inter links between neural layers that are to be removed. The epochs is a parameter that controls a number of cycles required during the learning process to train the entire training data set. The input sequence length is a parameter that controls a number words utilized from an input text for learning. The learning ratio is a parameter that controls the speed of a training process. The test ratio is a parameter that controls a number of training sets used for testing. Advantageously, this training user interface provides simplicity and enhanced customizability when training machine algorithms.

Once a user selects "start training" user button 455 as shown in FIG. 4L, the model training device 12, initiates training of the selected sentiment analyzer model 452 based on the received model input dataset 449 and the one or more training parameters 456. FIG. 4M displays a user interface 457 when the training has been initiated. The model training device 12, may generate a visual graph 457 indicating a training progress of the selected sentiment analyzer model. The visual graph 457 includes an accuracy graph 457b indicating the accuracy of the selected sentiment analyzer model and a loss graph 457a indicating the loss in accuracy of the selected sentiment analyzer model. Further the visual graph 457 is a dynamic graph which is updated constantly during the progress of the training. The indicator 458 may display the progress of the training. The horizontal-axis indicates the training progress measured by Epoch:Statement, for example, 2:100 means the training is at second round, with statement (training data set) #100. The vertical-axis of the visual graph indicates the accuracy (green line) and error (red line) that are associated with a point of training position (Epoch:Statement). The measure "epoch:statement" shown in FIG. 4M is a measurement of the progress of the training process. Further, a user may select a user actuatable button "Stop training" button 459, in order to manually stop the training. FIG. 4N displays the visual graph 461 upon the completion of the training of the selected sentiment analyzer model. Accuracy measures how close the model prediction results against the desired outputs, while loss measure how well the model is doing internally. A user to this application will strive for higher accuracy and lower loss, the better.

As an alternative in step 306, the model training device 12, may initiate testing of a machine learning model. With reference, FIGS. 4B-4D, in order to initiate a test, a user may select one of the plurality of project identifiers 425 is selected from the list of project identifiers 424 as shown in FIG. 4C. The selected identifier 425 is "Sentiment 01". Upon selection of the project identifier 425 the testing user interface 422 is updated to display the corresponding machine learning model 426 "Sentiment Analyzer" and a corresponding model input dataset 427 "Fed Sentiment Testing Set 01" associated with the selected one of the plurality of project identifiers 425 "Sentiment 01". The model training device 12 receives the input test data 428 for testing using the machine learning model 426 "Sentiment Analyzer". Upon a selection of the "Predict" button 431, the model training device receives the testing initiation request to initiate testing on the received input test data 428. In this example, the received input test data 428 is a text including words that is copied from a publication and pasted into the input box 430. FIG. 4D shows the Prediction result from testing of a machine learning model. The prediction functionality shown in FIG. 4D makes it seamless, and efficient for users at client devices to predict datasets based on stored machine learning models.

As a further alternative in step 306, the model training device 12 may initiate publication of a project based the received action of selecting the publish service 420. With reference to FIG. 4Q-4R that includes a drop down list 467a list as shown in FIG. Q. The model training device 12, receives an indication to publish when the "Publish" button 468d is selected. Upon receiving the indication, the selected project including the machine learning models 468b "Sentiment Analyzer" is published as a web service application and shared over the network to be utilized by other users accessing the adjustable management system. The published projects are stored in the service data storage 42.

In step 308, with reference to FIGS. 4L-4P, the model training device 12, generates a training report and testing report upon completion of the training performed in step 306. The selection of a training result button 463 displayed on the user interface 463 causes the model training device 12 to provide the training report 464a and the testing report 464b by displaying on the interface 464 as shown in FIG. N. Data points on the training report 464a can be selected to view the expected training value and a predicted training value. The data points on the testing report 464a can be selected to view the expected testing value and a predicted testing value. Further, with reference to FIG. 4P, upon double clicking by a user on the data points the model training device 12 displays the associated input file 465a from the model input dataset being trained at that point of the training report 464a or the testing report 464b.

In step 312, the model training device 12, determines if another action is received to be executed. The model training device 12 can display a prompt (not shown in the drawings) on the dashboard 400 indicating to the user of a client devices 16(1)-16(n), if another action is to be received. The displayed prompt can include a yes or no user actuatable graphical buttons as options for the user of the one of the client devices 16(1)-16(n) to select from. When the user of the one of the client devices 16(1)-16(n) selects the options of "yes", then the model training device 12 takes the yes branch and the method loops back to step 304. The method loops back to step 304 and continues to step 312 in the same way as explained above, but in this loop the method would execute another received action. When the user of the one of the client devices 16(1)-16(n) selects the options of "no", then the model training device 12 takes the no branch and ends.

The present invention provides an efficient and streamlined process of developing and training machine learning models. Advantageously, the present invention provides publishing of the trained machine learning models as web service applications to be accessed by all users over a dashboard, thereby reducing time required to publish a trained machine learning model. Accordingly, the present invention substantially reduces risk related to manual coding during a development process cycle of machine learning model training by providing an efficient and convenient process of training, developing, and sharing of trained machine learning models as web services. The model training device 12 can be a standalone device or integrated with one or more other devices or apparatuses. For example, the model training device 12, or components thereof including memory 26, can include or be hosted by one of the database server devices 14(1)-14(n), and other arrangements are also possible. Moreover, one or more of the components of the model training device 12 can be in a same or a different communication network including one or more public, private, or cloud networks, for example.

The database server devices 14(1)-14(n) may be any type of computing device capable of storing web service models, trained machine learning models, training datasets and testing datasets, and providing such data to the model training device when requested. Accordingly, each of the database server devices 14(1)-14(n) includes one or more processors, memory, and a communication interface, which are coupled together by a bus or other communication link.

The memory of the database server devices 14(1)-14(n) can also include databases to store publications, although other information can also be included in the memory of the database server devices 14(1)-14(n).

The client devices 16(1)-16(n) may be any device that enables a user to interact with a network that transmits and delivers data and information used by the various systems and methods described herein. The client devices 16(1)-16(n) may include desktop computers, laptop computers, tablet computers, smart phones, and other mobile computing devices, for example. The client devices 16(1)-16(n) may include a microprocessor, a microcontroller or other device operating under programmed control. These devices may further include an electronic memory such as a random access memory (RAM), electronically programmable read only memory (EPROM), other computer chip-based memory, a hard drive, or other magnetic, electrical, optical or other media, and other associated components connected over an electronic bus, as will be appreciated by persons skilled in the art. The client devices 16(1)-16(n) may be equipped with an integral or connectable liquid crystal display (LCD), electroluminescent display, a light emitting diode (LED), organic light emitting diode (OLED) or another display screen, panel or device for viewing and manipulating files, data and other resources, for instance using a graphical user interface (GUI) or a command line interface (CLI). The client devices 16(1)-16(n) may also include a network-enabled appliance or another TCP/IP client or other device. The client devices 16(1)-16(n) may include various connections such as a cell phone connection, Wi-Fi connection, Bluetooth connection, satellite network connection, and/or near field communication (NFC) connection, for example.

Although the exemplary network environment 10 with the model training device 12, database server devices 14(1)-14(n), client devices 16(1)-16(n), and communication network(s) 18 are described and illustrated herein, other types and/or numbers of systems, devices, components, and/or elements in other topologies can be used. It is to be understood that the systems of the examples described herein are for exemplary purposes, as many variations of the specific hardware and software used to implement the examples are possible, as will be appreciated by those skilled in the relevant art(s).

One or more of the devices depicted in the network environment 10, such as the model training device 12, database server devices 14(1)-14(n), or client devices 16(1)-16(n), for example, may be configured to operate as virtual instances on the same physical machine. In other words, one or more of the model training device 12, database server devices 14(1)-14(n), or client devices 16(1)-16(n) may operate on the same physical device rather than as separate devices communicating through communication network(s) 18. Additionally, there may be more or fewer model training devices, database server devices, or client devices than illustrated in FIG. 1.

In addition, two or more computing systems or devices can be substituted for any one of the systems or devices in any example. Accordingly, principles and advantages of distributed processing, such as redundancy and replication also can be implemented, as desired, to increase the robustness and performance of the devices and systems of the examples. The examples may also be implemented on computer system(s) that extend across any suitable network using any suitable interface mechanisms and traffic technologies, including by way of example only teletraffic in any suitable form (e.g., voice and modem), wireless traffic networks, cellular traffic networks, Packet Data Networks (PDNs), the Internet, intranets, and combinations thereof.

The examples may also be embodied as one or more non-transitory computer readable media having instructions stored thereon for one or more aspects of the present technology as described and illustrated by way of the examples herein. The instructions in some examples include executable code that, when executed by one or more processors, cause the processors to carry out steps necessary to implement the methods of the examples of this technology that are described and illustrated herein.

Although the embodiments of the present invention have been described herein in the context of a particular implementation in a particular environment for a particular purpose, those skilled in the art will recognize that its usefulness is not limited thereto and that the embodiments of the present invention can be beneficially implemented in other related environments for similar purposes.

What is claimed is:

1. A computer implemented method, comprising:
    storing, in a model training device, a plurality of machine learning models;
    storing, in the model training device, a plurality of datasets, the plurality of datasets including a plurality of training datasets and a plurality of test datasets;
    receiving, by the model training device and from a client device over a network, a request for utilizing an adjustable management system, the request for utilizing the adjustable management system including a request to open a model training application configured to provided user access to the adjustable management system, wherein the client device is connected to the model training device over the network;
    sharing, in response to the request and by the model training device, the adjustable management system comprising a model training dashboard having a plurality of graphical user interfaces, including a plurality of machine learning mode services comprising new project service, existing project service, new model service, existing model service, new dataset service, existing dataset service, training service, testing service, and publish service configured to enable selection and testing of one or more machine learning models and machine learning model datasets;
    receiving, by the model training device and from the client device, a machine learning model stored in the client device;
    storing, by the model training device, the machine learning model received from the client device along with the plurality of machine learning models;
    receiving, by the model training device, a new dataset stored in the client device, the new dataset comprising:
        a training dataset comprising a plurality of pairs of input files and target files, each input file including a set of text and each corresponding target file including an output indicating whether the input is positive or negative, wherein the training dataset is used to create and train a new machine learning model; and
        a test dataset comprising a plurality of pairs of input files and target files, each input file including a set of text and each corresponding target filed including an output indicating whether the input is positive or negative, wherein the test dataset is used to validate that the new machine learning model works;
    storing, by the model training device, the new dataset received from the client device along with the plurality of datasets;
    receiving, from the client device, a selection of a machine learning model among the machine learning model received from the client device and the plurality of machine learning models stored in the model training device;
    receiving, from the client device, a selection of a dataset to apply on the selected machine learning model among the new dataset received from the client device along with the plurality of datasets stored in the model training device;
    receiving, from the client device, an actuation of a virtual button for initiating training on the selected machine learning model by applying the selected dataset;
    after the actuating of the virtual button, receiving a plurality of parameter adjustments before commencement of the training, the plurality of parameter adjustments includes adjustments to each of a batch size, a dropout rate, epochs, learning rate, test ratio and an input sequence length;
    executing an action by the model training device and on the selected machine learning model using the selected dataset, based on the actuation of the virtual button and the received adjustments to the plurality of training parameters, the executed action comprising:
    training with the selected dataset,
    dynamically graphing both accuracy values and loss values, wherein the graph is constantly updated during progression of the training, and wherein the graph is defined by a horizontal axis indicating training progress measured by an epoch and a vertical axis indicating an accuracy and error associated with a training progress position along the horizontal axis;
    receiving, from the client device, an actuation of a second virtual button for generating a training report and a testing report upon completion of the training;
    after the actuating of the second virtual button, displaying the training report and the testing report;
    wherein selecting a data point on the training report and the testing report displays an expected value and predicted value;
    wherein upon double clicking the data point further displays an associated input file from a model input dataset being trained at that point of the training report or the testing report; and
    publishing the selected machine learning model after the training is completed.

2. The method of claim 1, wherein the plurality of datasets include a plurality of machine learning model datasets,
    wherein the plurality machine learning model datasets is one of a testing set or a training set, and
    wherein the machine learning model is uploaded from the client device in response to an action initiated by the user of the client device.

3. The method of claim 2, further comprising:
    testing, by the model training device, the machine learning model with a testing set in response to an action initiated by the user of the client device.

4. The method of claim 3, wherein once published, the machine learning model is stored onto a memory of the model training device for access by different client devices sharing the adjustable management system.

5. The method of claim 1, wherein the plurality of machine learning models is stored in a model data storage, and wherein the plurality of machine learning models includes at least one optimized machine learning model;
uploading, by the model training device, a machine learning dataset received from the client device in response to an action initiated by the user of the client device; and
validating, by the model training device, the uploaded machine learning dataset by the optimized machine learning model in response to an action initiated by the user of the client device.

6. The method of claim 1, wherein at least one of the plurality of parameters of the machine learning model are adjusted based on an adjustable training parameter input by the user at the client device.

7. A computer implemented system, comprising:
a model training device, including a memory, a processor, and a communication interface; and
a client device, connected to the model training device over a network,
wherein the model training device is configured to:
store a plurality of machine learning models;
store a plurality of datasets, the plurality of datasets including a plurality of training datasets and a plurality of test datasets;
receive, from the client device, a request for utilizing an adjustable management system, the request for utilizing the adjustable management system including a request to open a model training application configured to provided user access to the adjustable management system;
share, in response to the request, the adjustable management system comprising a model training dashboard having a plurality of graphical user interfaces, including a plurality of machine learning mode services comprising new project service, existing project service, new model service, existing model service, new dataset service, existing dataset service, training service, testing service, and publish service configured to enable selection and testing of one or more machine learning models and machine learning model datasets;
receive, from the client device, a machine learning model stored in the client device;
store the machine learning model received from the client device along with the plurality of machine learning models;
receive a new dataset stored in the client device, the new dataset comprising:
a training dataset comprising a plurality of pairs of input files and target files, each input file including a set of text and each corresponding target file including an output indicating whether the input is positive or negative, wherein the training dataset is used to create and train a new machine learning model; and
a test dataset comprising a plurality of pairs of input files and target files, each input file including a set of text and each corresponding target filed including an output indicating whether the input is positive or negative, wherein the test dataset is used to validate that the new machine learning model works;
store the new dataset received from the client device along with the plurality of datasets;
receive, from the client device, a selection of a machine learning model among the machine learning model received from the client device and the plurality of machine learning models stored in the model training device;
receive, from the client device, a selection of a dataset to apply on the selected machine learning model among the new dataset received from the client device along with the plurality of datasets stored in the model training device;
receive, from the client device, an actuation of a virtual button for initiating training on the selected machine learning model by applying the selected dataset;
after the actuating of the virtual button, receive a plurality of parameter adjustments before commencement of the training, the plurality of parameter adjustments includes adjustments to a batch size, a dropout rate, epochs, learning rate, test ratio, and an input sequence length;
execute an action by the model training device and on the selected machine learning model using the selected dataset, based on the actuation of the virtual button and the received adjustments to the plurality of training parameters, the executed action comprising:
training with the selected dataset,
dynamically graphing both accuracy values and loss values, wherein the graph is constantly updated during progression of the training, and wherein the graph is defined by a horizontal axis indicating training progress measured by an epoch and a vertical axis indicating an accuracy and error associated with a training progress position along the horizontal axis;
receiving, from the client device, an actuation of a second virtual button for generating a training report and a testing report upon completion of the training;
after the actuating of the second virtual button, displaying the training report and the testing report;
wherein selecting a data point on the training report and the testing report displays an expected value and predicted value;
wherein upon double clicking the data point further displays an associated input file from a model input dataset being trained at that point of the training report or the testing report; and
publishing the selected machine learning model after the training is completed.

8. The computer implemented system of claim 7, wherein the plurality of datasets include a plurality of machine learning model datasets in a model data storage,
wherein the plurality machine learning model datasets is one of a testing set or a training set, and
wherein the machine learning model is uploaded from the client device in response to an action initiated by the user of the client device.

9. The computer implemented system of claim 8, wherein the model training device is further configured to:
test the machine learning model with a testing set in response to an action initiated by the user of the client device.

10. The computer implemented system of claim 9, wherein once published, the machine learning model is stored onto a memory of the model training device for access by different client devices sharing the adjustable management system.

11. The computer implemented system of claim 7, wherein the plurality of machine learning models is stored in a model data storage,
   wherein the plurality of machine learning models includes at least one optimized machine learning model, and
   wherein the model training device is further configured to:
   upload a machine learning dataset received from the client device; and
   validate, by the model training device, the uploaded machine learning dataset by the optimized machine learning model in response to an action initiated by the user of the client device.

12. The computer implemented system of claim 7, wherein the model training device is further configured to:
   adjust at least one of the plurality of parameters of the machine learning model based on adjustable training parameters input by the user.

\* \* \* \* \*